US006396772B1

(12) United States Patent
Yabe et al.

(10) Patent No.: US 6,396,772 B1
(45) Date of Patent: May 28, 2002

(54) ELECTRONIC APPARATUS AND CONTROL METHOD FOR ELECTRONIC APPARATUS

(75) Inventors: Hiroshi Yabe; Makoto Okeya, both of Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/623,738

(22) PCT Filed: Dec. 14, 1999

(86) PCT No.: PCT/JP99/07002

§ 371 (c)(1), (2), (4) Date: Sep. 6, 1999

(87) PCT Pub. No.: WO00/41041

PCT Pub. Date: Jul. 13, 2000

(30) Foreign Application Priority Data

Jan. 6, 1999 (JP) .......................................... 11-001427

(51) Int. Cl.[7] .......................... G04B 1/00; G04C 3/00; H02J 7/00

(52) U.S. Cl. ...................... 368/204; 320/128; 320/137; 320/166

(58) Field of Search .......................... 368/64, 66, 203, 368/204, 205; 320/128, 137, 166; 323/222, 282

(56) References Cited

U.S. PATENT DOCUMENTS 5,001,685 A * 3/1991 Hayakawa .................. 368/204
5,130,960 A * 7/1992 Hayakawa .................. 368/64
5,798,985 A * 8/1998 Nakajima .................. 368/64

FOREIGN PATENT DOCUMENTS

JP 7-72271 3/1995
JP 9-171086 6/1997
JP 10-26675 1/1998

* cited by examiner

*Primary Examiner*—Vit Miska
(74) *Attorney, Agent, or Firm*—Rosalio Haro

(57) ABSTRACT

In the transition from a state in which charge is being transferred from a large-capacitance secondary power supply to an auxiliary capacitor through a step-up/down circuit by a step-up/down multiplying factor M' (M' is a positive real number excluding one) to a state in which the large-capacitance secondary power supply and the auxiliary capacitor are electrically directly coupled, the electrical energy is transferred from the large-capacitance secondary power supply to the auxiliary capacitor through the step-up/down circuit by a step-up/down multiplying factor M=1 in a non-stepping-up/down state. A potential difference between the large-capacitance secondary power supply and the auxiliary capacitor is less than a predetermined potential difference. Since a sudden variation in a power supply voltage due to changing the step-up/down multiplying factor is prevented, malfunctioning in an electronic apparatus resulting from the sudden variation in the power supply voltage is prevented.

35 Claims, 22 Drawing Sheets

(a)

| BOOST MULTIPLYING FACTOR | CONNECTION | SW1 | SW2 | SW3 | SW4 | SW11 | SW12 | SW13 | SW14 | SW21 |
|---|---|---|---|---|---|---|---|---|---|---|
| x3 | PARALLEL | ON | OFF | ON | OFF | ON | OFF | ON | OFF | OFF |
| | SERIAL | OFF | ON | OFF | OFF | OFF | OFF | OFF | ON | ON |
| x2 | PARALLEL | ON | OFF | ON | OFF | ON | OFF | ON | OFF | OFF |
| | SERIAL | OFF | ON | OFF | ON | OFF | ON | OFF | ON | OFF |
| x1.5 | PARALLEL | ON | OFF | OFF | OFF | OFF | OFF | ON | OFF | ON |
| | SERIAL | OFF | ON | OFF | ON | OFF | ON | OFF | ON | OFF |
| NO BOOSTING (DIRECT COUPLING) | PARALLEL | OFF | ON | ON | ON | OFF | ON | ON | ON | OFF |
| | SERIAL | OFF | ON | ON | ON | OFF | ON | ON | ON | OFF |
| x1/2 | PARALLEL | ON | OFF | OFF | OFF | OFF | OFF | ON | OFF | ON |
| | SERIAL | ON | OFF | OFF | ON | ON | OFF | OFF | ON | OFF |

(b)

| BOOST MULTIPLYING FACTOR | CONNECTION | SW1 | SW2 | SW3 | SW4 | SW11 | SW12 | SW13 | SW14 | SW21 |
|---|---|---|---|---|---|---|---|---|---|---|
| NO BOOSTING | PARALLEL | ON | OFF | ON | OFF | ON | OFF | ON | OFF | OFF |
| TRANSFER MODE | SERIAL | ON | OFF | OFF | ON | ON | OFF | OFF | ON | OFF |

FIG._3

DIRECT COUPLING (x1 BOOSTING; SHORTING)

| Q3 | Q2 | Q1 | |
|---|---|---|---|
| 0 | 0 | 0 | x3 |
| 0 | 0 | 1 | x2 |
| 0 | 1 | 0 | x1.5 |
| 0 | 1 | 1 | NO BOOSTING |
| 1 | – | – | x1/2 |

| VOLTAGE ACROSS R | POWER CONSUMPTION | AD1 | AD2 | CK | FREQUENCY |
|---|---|---|---|---|---|
| SMALL (FIRST STAGE) | SMALL | 0 | 0 | CL4 | LOW |
| ↕ | ↕ | 0 | 1 | CL3 | ↕ |
| | | 1 | 0 | CL2 | |
| LARGE (FOURTH STAGE) | LARGE | 1 | 1 | CL1 | HIGH |

| L1ON | L2ON | L3ON | D | CK | FREQUENCY |
|---|---|---|---|---|---|
| 0 | 0 | 0 | D1 | CL8 | LOW |
| 0 | 0 | 1 | D2 | CL7 | ↕ |
| 0 | 1 | 0 | D3 | CL6 | |
| ⋮ | ⋮ | ⋮ | ⋮ | ⋮ | |
| 1 | 1 | 1 | D8 | CL1 | HIGH |

ELECTRONIC APPARATUS AND CONTROL METHOD FOR ELECTRONIC APPARATUS

BACKGROUND OF THE INVENTION

1. Field of the Invention

The present invention relates to electronic apparatuses and control methods for the electronic apparatuses, and more particularly relates to a power supply control technology for a portable electronically-controlled timepiece including a built-in power generating device.

2. Description of the Related Art

Recently, small electronic timepieces, such as wristwatches, provided therein with a power generator, such as a solar battery, which can operate without replacing a battery have been realized. These electronic timepieces are provided with a function of accumulating power generated by the power generator in a large-capacitance capacitor or the like. When power is not generated, power discharged from the capacitor is used to indicate the time. Therefore, these timepieces can stably operate for a long period of time without a battery. Taking into consideration the burden of replacing or discarding a battery, it is expected that in future many timepieces will be provided therein with a power generator.

The timepieces including the power generator can be constructed as follows in order to stably supply power to a drive circuit of the timepieces. Electrical energy generated by the power generator is accumulated in a large-capacity power supply (for example, a secondary battery). A voltage of the secondary power supply is accumulated in a small-capacity power supply (for example, a capacitor) via a step-up/down circuit including a step-up/down capacitor for increasing or decreasing the voltage of the secondary power supply. Subsequently, the voltage is supplied to the drive circuit.

In the transition from a step-up/down state in which the voltage is increased or decreased through the step-up/down capacitor to a direct coupling state in which the large-capacity power supply is directly coupled to the small-capacity power supply, it is probable that charge (electrical energy) is suddenly transferred from the large-capacity power supply side to the small-capacity power supply side, or from the small-capacity power supply side to the large-capacity power supply side in accordance with the relative voltage relationship between the large-capacity power supply and the small-capacity power supply.

In such cases, a sudden variation occurs in the voltage supplied to the drive circuit of the small-capacity power supply. This may cause malfunctioning in the drive circuit or a control circuit.

Accordingly, it is an object of the present invention to provide an electronic apparatus and a control method for the electronic apparatus in which malfunctioning in a drive circuit or a control circuit is prevented in the transition from a step-up/down state to a direct coupling state.

SUMMARY OF THE INVENTION

A first embodiment of the present invention is characterized by including a power generating unit for performing power generation by converting first energy into second energy which is electrical energy; a first power supply unit for accumulating the electrical energy obtained by the power generation; a power supply voltage converting unit for converting the voltage of the electrical energy supplied from the first power supply unit by a voltage-conversion multiplying factor M (M is a positive real number); a second power supply unit, to which the electrical energy accumulated in the first power supply unit is transferred through the power supply voltage converting unit, for accumulating the transferred electrical energy; a driven unit driven by the electrical energy supplied from the first power supply unit or the second power supply unit; and a non-voltage-converting transfer control unit for transferring, in the transition from a state in which the electrical energy is being transferred from the first power supply unit to the second power supply unit through the power supply voltage converting unit by a voltage-conversion multiplying factor M' (M' is a positive real number except for one) to a state in which the first power supply unit and the second power supply unit are electrically directly coupled, the electrical energy from the first power supply unit to the second power supply unit through the power supply voltage converting unit by the voltage-conversion multiplying factor M=1 in a non-voltage-converting state, wherein a potential difference between the first power supply unit and the second power supply unit is less than a predetermined potential difference.

A second embodiment of the present invention is characterized in that, in the first embodiment, the electrical energy transfer to the second power supply unit is performed in an accumulating cycle for accumulating the electrical energy from the first power supply unit in the power supply voltage converting unit and a transfer cycle for transferring the electrical energy accumulated in the power supply voltage converting unit to the second power supply unit. The non-voltage-converting transfer control unit includes a number-of-transfers control unit for changing, when the accumulating cycle and the transfer cycle are repeated, the number of transfers which is the number of transfer cycles per unit time based on the electrical energy transfer ability required.

A third embodiment of the present invention is characterized in that, in the second embodiment, the number-of-transfers control unit determines the number of transfers based on power consumed by the driven unit.

A fourth embodiment of the present invention is characterized by including, in the third embodiment, a power consumption detecting unit for detecting the power consumed by the driven unit.

A fifth embodiment of the present invention is characterized in that, in the second embodiment, the number-of-transfers control unit includes a number-of-transfers storage unit for storing beforehand the numbers of transfers corresponding to a plurality of driven units, and a number-of-transfers determining unit for determining the number of transfers to be read from the number-of-transfers storage unit by referring to the driven unit to be actually driven from among the plurality of driven units.

A sixth embodiment of the present invention is characterized in that, in the second embodiment, the power supply voltage converting unit includes a step-up/down capacitor for performing voltage conversion. The number-of-transfers control unit determines the number of transfers based on the capacitance of the step-up/down capacitor.

A seventh embodiment of the present invention is characterized in that, in the second embodiment, in a single transfer cycle, when a transferable electrical energy amount is expressed by Q0, the number of transfers per unit time is expressed by N, and power consumed by the driven unit per unit time is expressed by QDRV, the number-of-transfers control unit determines the number of transfers per unit time N so as to satisfy the following expression:

$$QDRV \leqq Q0 \times N$$

An eighth embodiment of the present invention is characterized in that, in the first embodiment, the non-voltage-converting transfer control unit includes a unit for inhibiting, when the electrical energy is being transferred to the second power supply unit in the non-voltage-converting state, driving of a high load during a transfer for inhibiting driving of the driven unit that consumes power exceeding power corresponding to electrical energy which can be supplied in the transfer.

A ninth embodiment of the present invention is characterized in that, in the first embodiment, the driven unit includes a timer unit for indicating the time.

In a tenth embodiment of the present invention, there is provided a control method for an electronic apparatus including a power generator for performing power generation by converting first energy into second energy which is electrical energy; a first power supply for accumulating the electrical energy obtained by the power generation; a power supply voltage converter for converting the voltage of the electrical energy supplied from the first power supply by a voltage-conversion multiplying factor M (M is a positive real number); a second power supply, to which the electrical energy accumulated in the first power supply is transferred through the power supply voltage converter, for accumulating the transferred electrical energy; and a driven unit driven by the electrical energy supplied from the first power supply or the second power supply. The control method is characterized by including a non-voltage-converting transfer control step of transferring, in the transition from a state in which the electrical energy is being transferred from the first power supply to the second power supply through the power supply voltage converter by a voltage-conversion multiplying factor M' (M' is a positive real number except for one) to a state in which the first power supply and the second power supply are electrically directly coupled, the electrical energy from the first power supply to the second power supply through the power supply voltage converter by the voltage-conversion multiplying factor M=1 in a non-voltage-converting state, wherein a potential difference between the first power supply and the second power supply is less than a predetermined potential difference.

An eleventh embodiment of the present invention is characterized in that, in the tenth embodiment, the electrical energy transfer to the second power supply is performed in an accumulating cycle for accumulating the electrical energy from the first power supply in the power supply voltage converter and a transfer cycle for transferring the electrical energy accumulated in the power supply voltage converter to the second power supply. The non-voltage-converting transfer control step includes a number-of-transfers control step of changing, when the accumulating cycle and the transfer cycle are repeated, the number of transfers which is the number of transfer cycles per unit time based on the electrical energy transfer ability required.

A twelfth embodiment of the present invention is characterized in that, in the eleventh embodiment, the number-of-transfers control step determines the number of transfers based on power consumed by the driven unit.

A thirteenth embodiment of the present invention is characterized by including, in the twelfth embodiment, a power consumption detecting step of detecting the power consumed by the driven units.

A fourteenth embodiment of the present invention is characterized in that, in the eleventh embodiment, the number-of-transfers control step includes a number-of-transfers determining step of determining, from among the pre-stored numbers of transfers corresponding to a plurality of driven units, the number of transfers by referring to the driven unit to be actually driven.

A fifteenth embodiment of the present invention is characterized in that, in the eleventh embodiment, the power supply voltage converter includes a step-up/down capacitor for performing voltage conversion. The number-of-transfers control step determines the number of transfers based on the capacitance of the step-up/down capacitor.

A sixteenth embodiment of the present invention is characterized in that, in the eleventh embodiment, in a single transfer cycle, when a transferable electrical energy amount is expressed by Q0, the number of transfers per unit time is expressed by N, and power consumed by the driven unit per unit time is expressed by QDRV, the number-of-transfers control step determines the number of transfers per unit time N so as to satisfy the following expression:

$$QDRV \leqq Q0 \times N$$

A seventeenth embodiment of the present invention is characterized in that, in the tenth embodiment, the non-voltage-converting transfer control step includes a step of inhibiting, when the electrical energy is being transferred to the second power supply in the non-voltage-converting state, driving of a high load during a transfer for inhibiting driving of the driven unit that consumes power exceeding power corresponding to electrical energy which can be supplied in the transfer.

BRIEF DESCRIPTION OF THE DRAWINGS

FIG. 3 includes illustrations of the operation of the step-up/down circuit.

DESCRIPTION OF THE PREFERRED EMBODIMENTS

Preferred embodiments of the present invention are described with reference to the drawings.

[1] First Embodiment

[1.1] Schematic Structure

Figure 1:
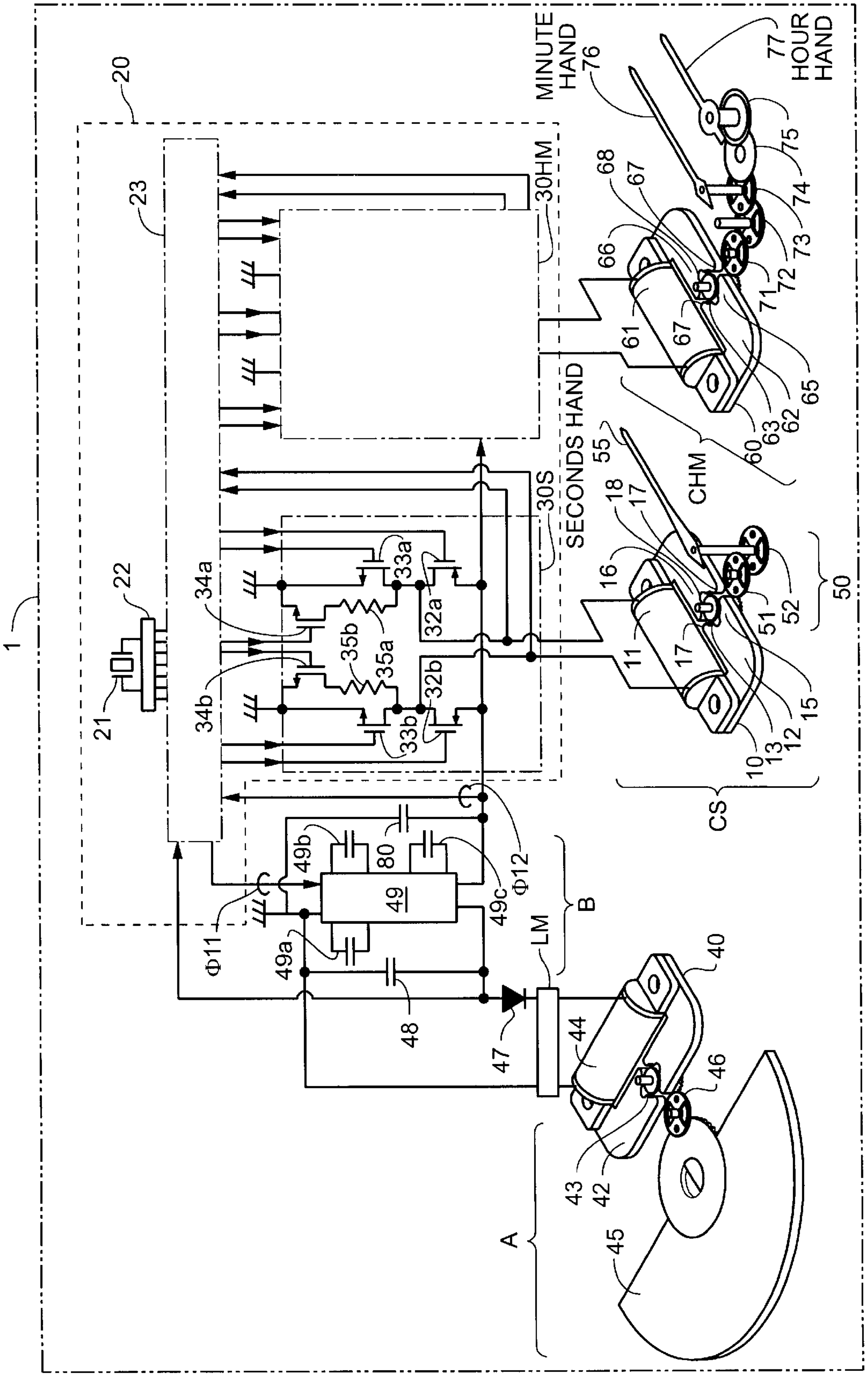
FIG. 1 is an illustration of the schematic structure of a timepiece according to a first embodiment of the present invention.

In FIG. 1, the schematic structure of a timepiece 1 according to a first embodiment of the present invention is shown.

The timepiece 1 is a wristwatch. A user uses the timepiece 1 by wearing a strap connected to the timepiece main body around the wrist.

The timepiece 1 of the present embodiment is roughly divided into a power generating unit A for generating AC power; a power supply B for rectifying the AC voltage from the power generating unit A, accumulating a boosted voltage, and supplying power to each component; a controller 23, including a power generation state detector 91 (see FIG. 10) for detecting a power generation state of the power generating unit A, which controls the entire timepiece based on the detection result; a seconds-hand carrying mechanism CS for driving a seconds hand 55 using a stepping motor 10; an hour/minute-hand carrying mechanism CHM for driving a minute hand and an hour hand using a stepping motor; a seconds-hand driver 30S for driving the seconds-hand carrying mechanism CS based on a control signal from the controller 23; an hour/minute-hand driver 30HM for driving the hour/minute-hand carrying mechanism CHM based on a control signal from the controller 23; and an external input unit 100 (see FIG. 10) for performing a setting operation for shifting the operation mode of the timepiece 1 from a time-indicating mode to a calendar-correcting mode, to a time-correcting mode, or forcedly to a power-saving mode (described hereinafter).

In accordance with the power generation state of the power generating unit A, the controller 23 switches between the indicating mode (normal operation mode) in which the time is indicated by driving the carrying mechanisms CS and CHM and the power-saving mode in which power is saved by stopping the supply of power to the seconds-hand carrying mechanism CS and the hour/minute-hand carrying mechanism CHM. The transition from the power-saving mode to the indicating mode is made by shaking the timepiece 1 by the hand of the user. This forcedly generates power, and a predetermined generated voltage is detected. As a result, the mode is forcedly shifted.

[1.2] Detailed Structure

The components of the timepiece 1 are described. The controller 23 is described hereinafter.

[1.2.1] Power Generating Unit

The power generating unit A is described.

The power generating unit A includes a power generator 40, an oscillating weight 45, and a speed-increasing gear 46.

Concerning the power generator 40, an electromagnetic induction AC power generator is used in which a power generating rotor 43 rotates in a power generating stator 42 and power induced in a power generating coil 44 connected to the power generating stator 42 is output.

The oscillating weight 45 functions as means for transferring kinetic energy to the power generating rotor 43. The motion of the oscillating weight 45 is transferred via the speed-increasing gear 46 to the power generating rotor 43.

The oscillating weight 45 is designed to spin in the wristwatch-type timepiece 1 using the motion of the user's arm. Therefore, energy related to the user's life is employed to generate power, and that power is used to drive the timepiece 1.

[1.2.2] Power Supply

Next, the power supply B is described.

The power supply B includes a limiter circuit LM for preventing application of an over-voltage to a subsequent stage in the circuit, a diode 47 operating as a rectification circuit, a large-capacity secondary power supply 48, a step-up/down circuit 49, and an auxiliary capacitor 80.

The step-up/down circuit 49 uses a plurality of capacitors 49*a* and 49*b* to increase or decrease the voltage in multiple steps. The step-up/down circuit 49 is described in detail below.

The stepped-up/down power is accumulated in the auxiliary capacitor 80.

In this case, the step-up/down circuit 49 can adjust the voltage supplied to the auxiliary capacitor 80 and the voltage supplied to the seconds-hand driver 30S and the hour/minute-hand driver 30HM based on a control signal $\phi$11 from the controller 23.

The power supply B uses Vdd (high-voltage side) as a reference potential (GND) and generates Vss (low-voltage side) as a power supply voltage.

The limiter circuit LM is described.

The limiter circuit LM functions equivalently to a switch for shorting the power generating unit A. When a generated voltage VGEN of the power generating unit A exceeds a predetermined limit reference voltage VLM, the limiter circuit LM is turned on (closed).

As a result, the power generating unit A is electrically decoupled from the large-capacity secondary power supply 48.

Alternatively, when the voltage of the large-capacity secondary power supply 48 or the auxiliary capacitor 80 exceeds the predetermined voltage, the limiter circuit LM breaks the connection between the power generating unit A and the large-capacity secondary power supply 48 using a switch.

Accordingly, the generated over-voltage VGEN is not applied to the large-capacity secondary power supply 48 in both cases. This prevents damage to the large-capacity secondary power supply 48 resulting from application of the generated voltage VGEN that exceeds the withstanding voltage of the large-capacity secondary power supply 45 thus preventing damage to the timepiece 1.

Next, the step-up/down circuit 49 is described with reference to FIGS. 2 to 9.

Figure 2:
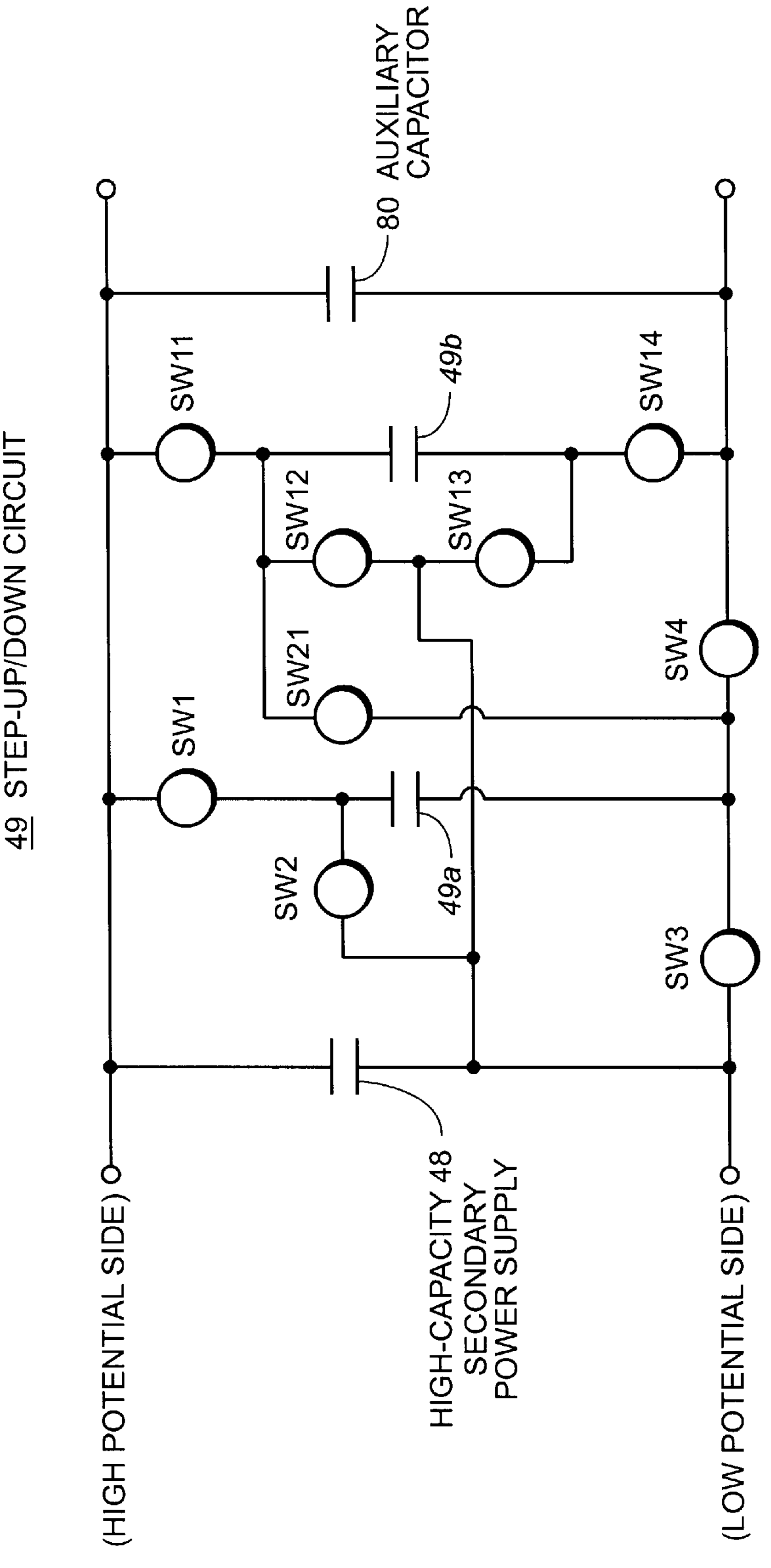
FIG. 2 is a diagram of the schematic structure of a step-up/down circuit.

As shown in FIG. 2, the step-up/down circuit 49 includes a switch SW1 having one terminal connected to a high-potential-side terminal of the large-capacity secondary power supply 48; a switch SW2 having one terminal connected to the other terminal of the switch SW1 and the other terminal connected to a low-potential-side terminal of the large-capacity secondary power supply 48; the capacitor 49*a* having one terminal connected to a node between the switch SW1 and the switch SW2; a switch SW3 having one terminal connected to the other terminal of the capacitor 49*a* and the other terminal connected to the low-potential-side terminal of the large-capacity secondary power supply 48; a switch SW4 having one terminal connected to a low-potential-side terminal of the auxiliary capacitor 80 and the other terminal connected to a node between the capacitor 49*a* and the switch SW3; a switch SW11 having one terminal connected to a node between the high-potential-side terminal of the large-capacity secondary power supply 48 and a high-potential-side terminal of the auxiliary capacitor 80; a switch SW12 having one terminal connected to the other terminal of the switch SW11 and the other terminal connected to the low-potential-side terminal of the large-capacity secondary power supply 48; the capacitor 49*b* having one terminal connected to the node between the switch SW11 and the switch SW12; a switch SW13 having one terminal connected to the other terminal of the capacitor 49*b* and the other terminal connected to a node between the switch S12 and the low-potential-side terminal of the high-capacity secondary power supply 48; a switch SW14 having one terminal connected to a node between the capacitor 49*b* and the switch SW13 and the other terminal connected to the low-potential-side terminal of the auxiliary capacitor 80; and a switch SW21 having one terminal connected to the node between the switch SW11 and the switch SW12 and the other terminal connected to a node between the capacitor 49*a* and the switch SW3.

[1.2.2.1] Operation of the Step-up/down Circuit

The schematic operation of the step-up/down circuit is described with reference to FIGS. 3 to 9. Cases of ×3 boosting, ×2 boosting, ×1.5 boosting, ×1 boosting (shorting mode), stepping-down by ½, and ×1 boosting (charge transfer mode) are described by way of examples.

[1.2.2.1.1] ×3 Boosting

Figure 11:
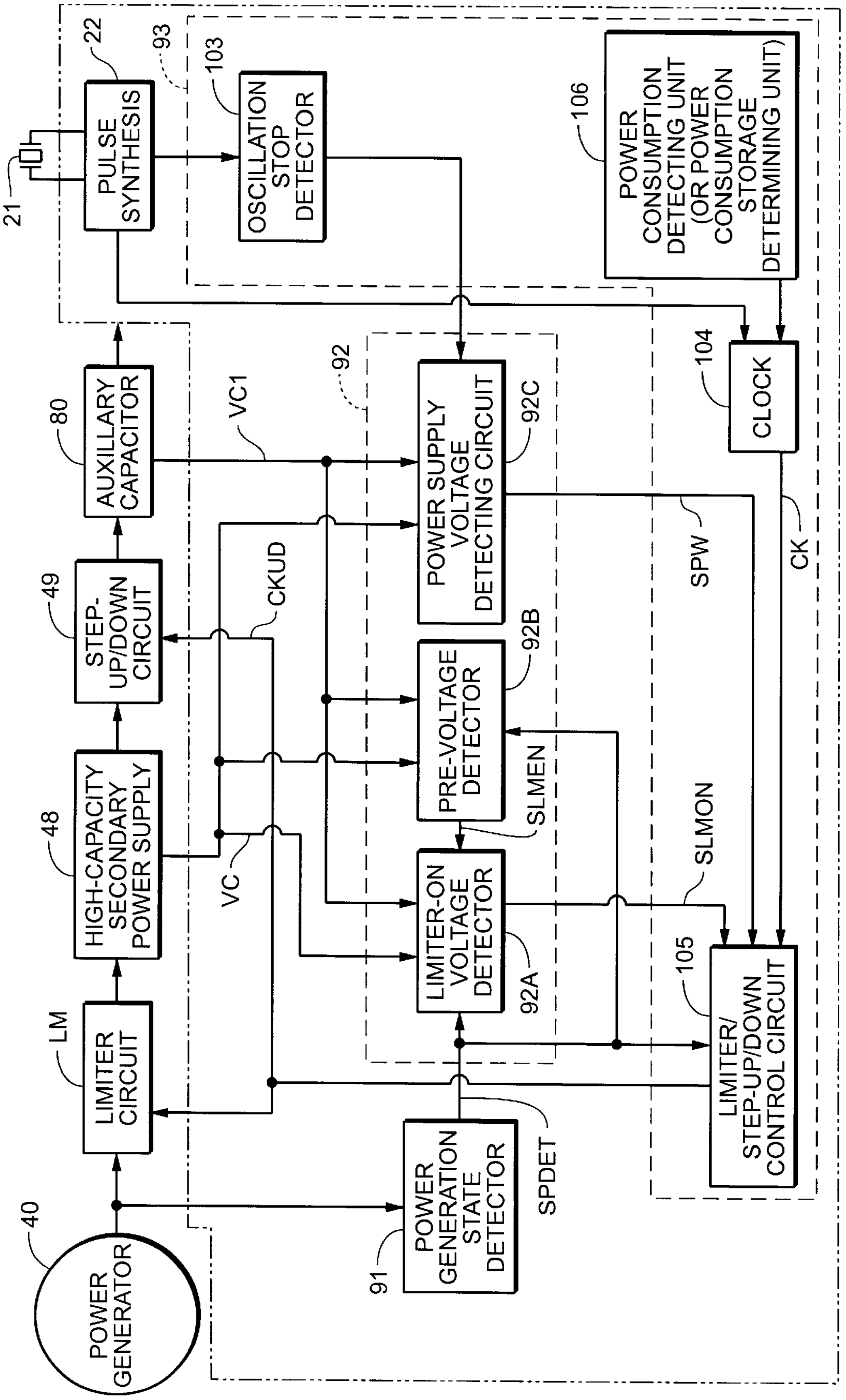
FIG. 11 is a block diagram of the detailed structure of basic portions of the control unit and its surrounding portions according to the first embodiment.

The step-up/down circuit 49 operates based on a step-up/down clock CKUD generated by a limiter/step-up/down control circuit 105 (see FIG. 11) using a clock signal CK from a clock generating circuit 104 (see FIG. 11). In ×3 boosting, as shown in FIG. 3(*a*), at a first step-up/down clock timing (parallel connection timing), the switch SW1 is turned on, the switch SW2 is turned off, the switch SW3 is turned on, the switch SW4 is turned off, the switch SW11 is turned on, the switch SW12 is turned off, the switch SW13 is turned on, the switch SW14 is turned off, and the switch SW21 is turned off.

Figure 4:
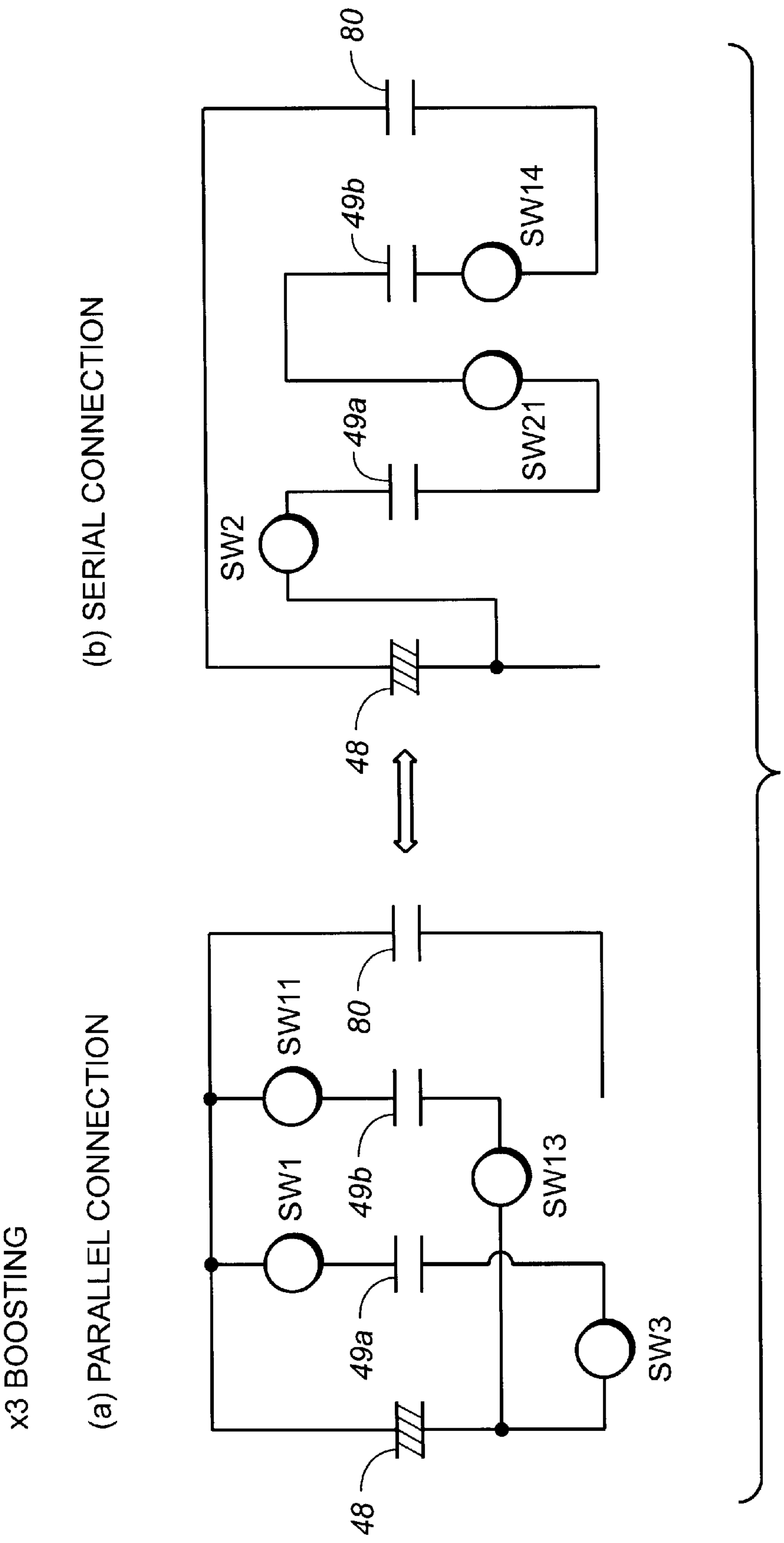
FIG. 4 includes equivalent circuit diagrams when a voltage is ×3 boosted.

In this case, the equivalent circuit of the step-up/down circuit 49 is as shown in FIG. 4(*a*). Power is supplied from the large-capacity secondary power supply 48 to the capacitor 49*a* and to the capacitor 49*b*. Charging is performed until the voltages of the capacitor 49*a* and the capacitor 49*b* become substantially equal to the voltage of the large-capacity secondary power supply 48.

At a second step-up/down clock timing (serial connection timing), the switch SW1 is turned off, the switch SW2 is turned on, the switch SW3 is turned off, the switch SW4 is turned off, the switch SW11 is turned off, the switch SW12 is turned off, the switch SW13 is turned off, the switch SW14 is turned on, and the switch SW21 is turned on.

In this case, the equivalent circuit of the step-up/down circuit 49 is as shown in FIG. 4(*b*). The large-capacity secondary power supply 48, the capacitor 49*a*, and the capacitor 49*b* are serially connected. The auxiliary capacitor 80 is charged by a voltage three times the voltage of the large-capacity secondary power supply 48, thus performing ×3 boosting.

[1.2.2.1.2] ×2 Boosting

The step-up/down circuit 49 operates based on the step-up/down clock CKUD generated by the limiter/step-up/down control circuit 105 (see FIG. 11) using the clock signal CK from the clock generating circuit 104 (see FIG. 11). In ×2 boosting, as shown in FIG. 3(*a*), at the first step-up/down clock timing (parallel connection timing), the switch SW1 is turned on, the switch SW2 is turned off, the switch SW3 is turned on, the switch SW4 is turned off, the switch SW11 is turned on, the switch SW12 is turned off, the switch SW13 is turned on, the switch SW14 is turned off, and the switch SW21 is turned off.

Figure 5:
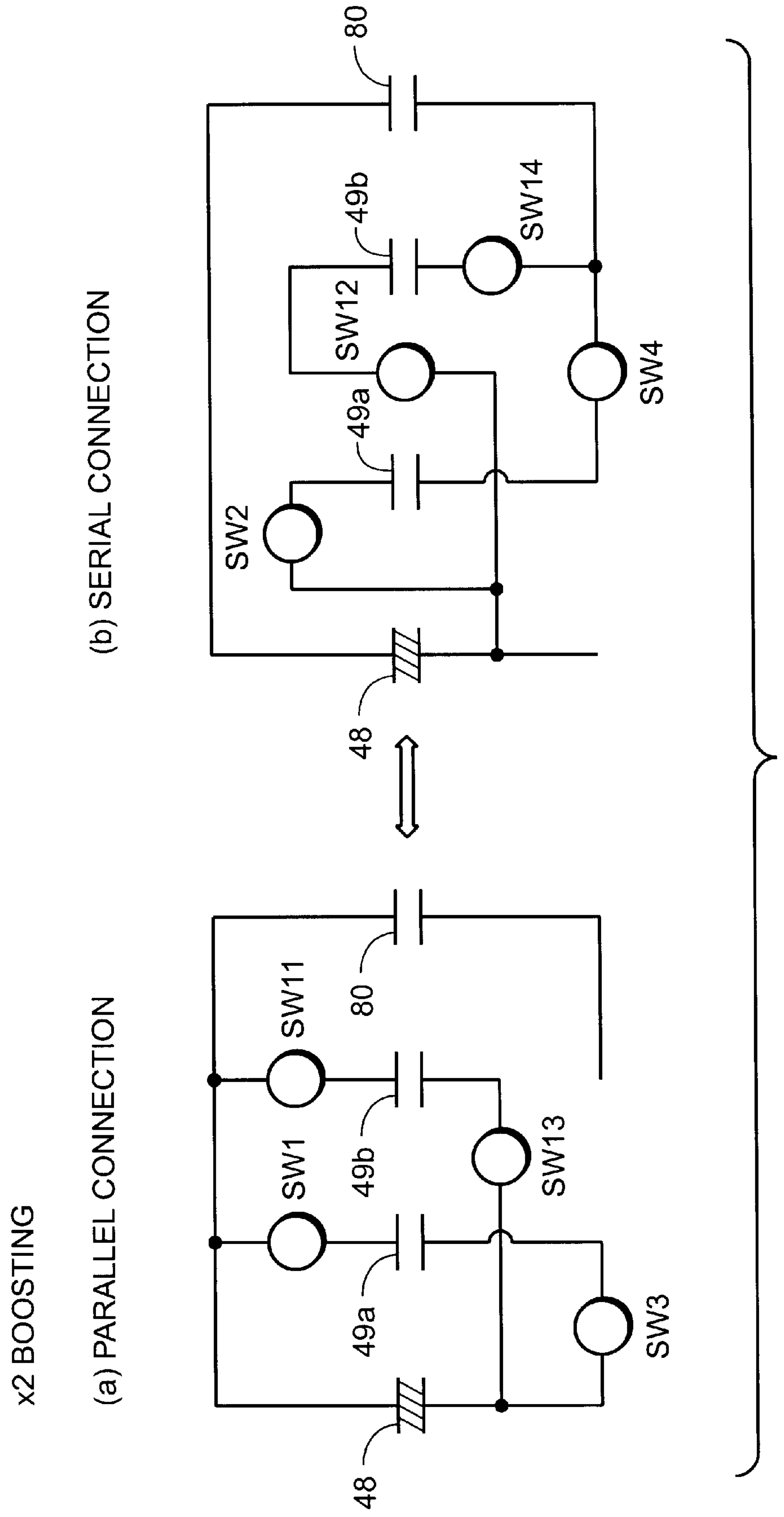
FIG. 5 includes equivalent circuit diagrams when a voltage is ×2 boosted.

In this case, the equivalent circuit of the step-up/down circuit 49 is as shown in FIG. 5(*a*). Power is supplied from the large-capacity secondary power supply 48 to the capacitor 49*a* and to the capacitor 49*b*. Charging is performed until the voltages of the capacitor 49*a* and the capacitor 49*b* become substantially equal to the voltage of the large-capacity secondary power supply 48.

At the second step-up/down clock timing (serial connection timing), the switch SW1 is turned off, the switch SW2 is turned on, the switch SW3 is turned off, the switch SW4 is turned on, the switch SW11 is turned off, the switch SW12 is turned on, the switch SW13 is turned off, the switch SW14 is turned on, and the switch SW21 is turned off.

In this case, the equivalent circuit of the step-up/down circuit 49 is as shown in FIG. 5(*b*). The large-capacity secondary power supply 49 is serially connected to the capacitor 49*a* and the capacitor 49*b*, which are connected in parallel. The auxiliary capacitor 80 is charged by a voltage double the voltage of the large-capacity secondary power supply 48, thus performing ×2 boosting.

[1.2.2.1.3] ×1.5 Boosting

The step-up/down circuit 49 operates based on the step-up/down clock CKUD generated by the limiter/step-up/down control circuit 105 (see FIG. 11) using the clock signal CK from the clock generating circuit 104 (see FIG. 11). In ×1.5 boosting, as shown in FIG. 3(*a*), at the first step-up/down clock timing (parallel connection timing), the switch SW1 is turned on, the switch SW2 is turned off, the switch SW3 is turned off, the switch SW4 is turned off, the switch SW11 is turned off, the switch SW12 is turned off, the switch SW13 is turned on, the switch SW14 is turned off, and the switch SW21 is turned on.

Figure 6:
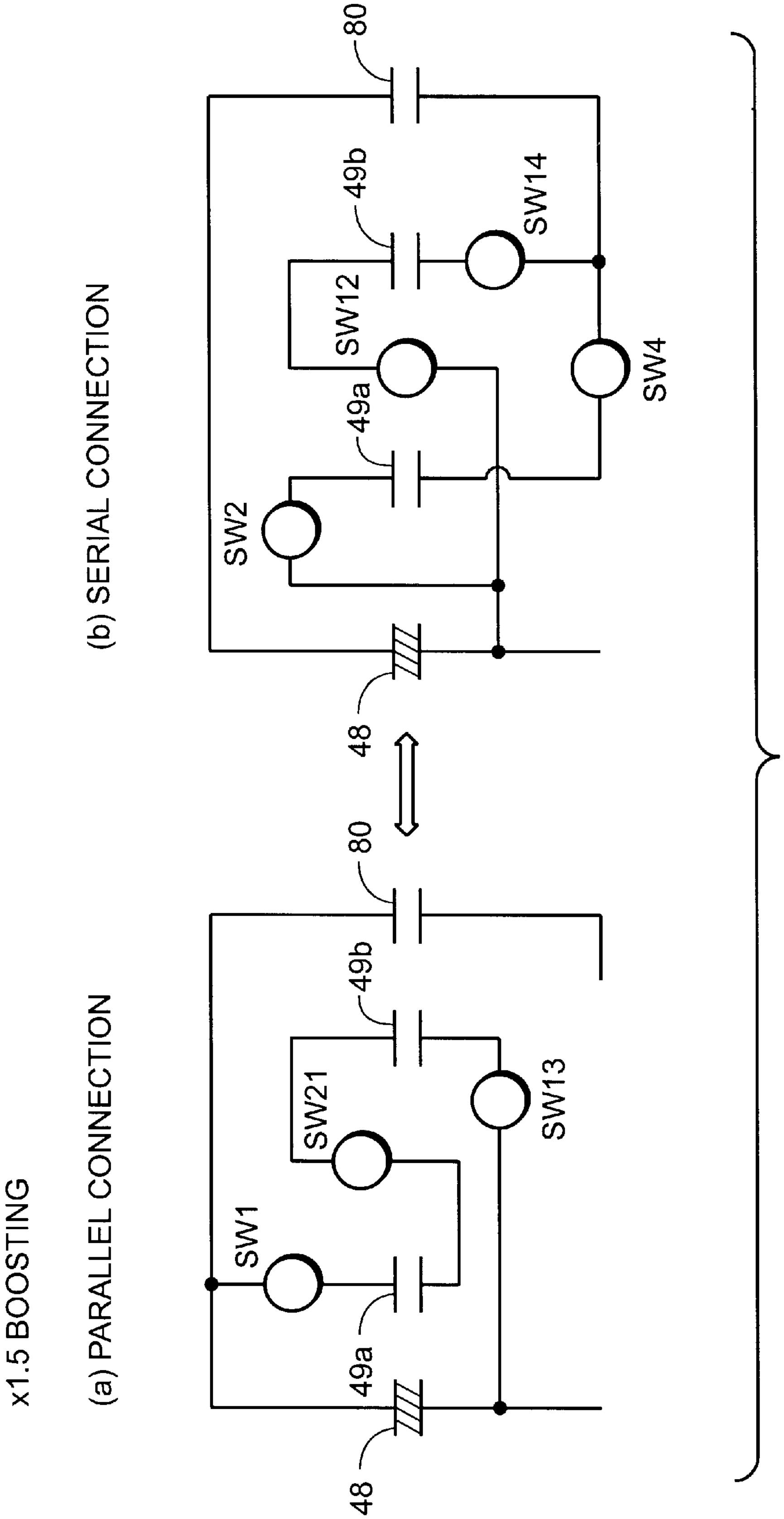
FIG. 6 includes equivalent circuit diagrams when a voltage is ×1.5 boosted.

In this case, the equivalent circuit of the step-up/down circuit 49 is as shown in FIG. 6(*a*). Power is supplied from the large-capacity secondary power supply 48 to the capacitor 49*a* and the capacitor 49*b*. Charging is performed until the voltages of the capacitor 49*a* and to the capacitor 49*b* become substantially equal to half the voltage of the large-capacity secondary power supply 48.

At the second step-up/down clock timing (serial connection timing), the switch SW1 is turned off, the switch SW2 is turned on, the switch SW3 is turned off, the switch SW4 is turned on, the switch SW11 is turned off, the switch SW12 is turned on, the switch SW13 is turned off, the switch SW14 is turned on, and the switch SW21 is turned off.

In this case, the equivalent circuit of the step-up/down circuit 49 is as shown in FIG. 6(*b*). The large-capacity secondary power supply 48 is serially connected to the capacitor 49*a* and the capacitor 49*b*, which are connected in parallel. The auxiliary capacitor 80 is charged by a voltage 1.5 times the voltage of the large-capacity secondary power supply 48, thus performing ×1.5 boosting.

[1.2.2.1.4] ×1 Boosting (No Stepping-up/down; Shorting Mode)

In ×1 boosting, as shown in FIG. 3(*a*), the step-up/down circuit 49 turns off the switch SW1, turns on the switch SW2, turns on the switch SW3, turns on the switch SW4, turns off the switch SW11, turns on the switch SW12, turns on the switch SW13, turns on the switch SW14, and turns off the switch SW21.

Figure 7:
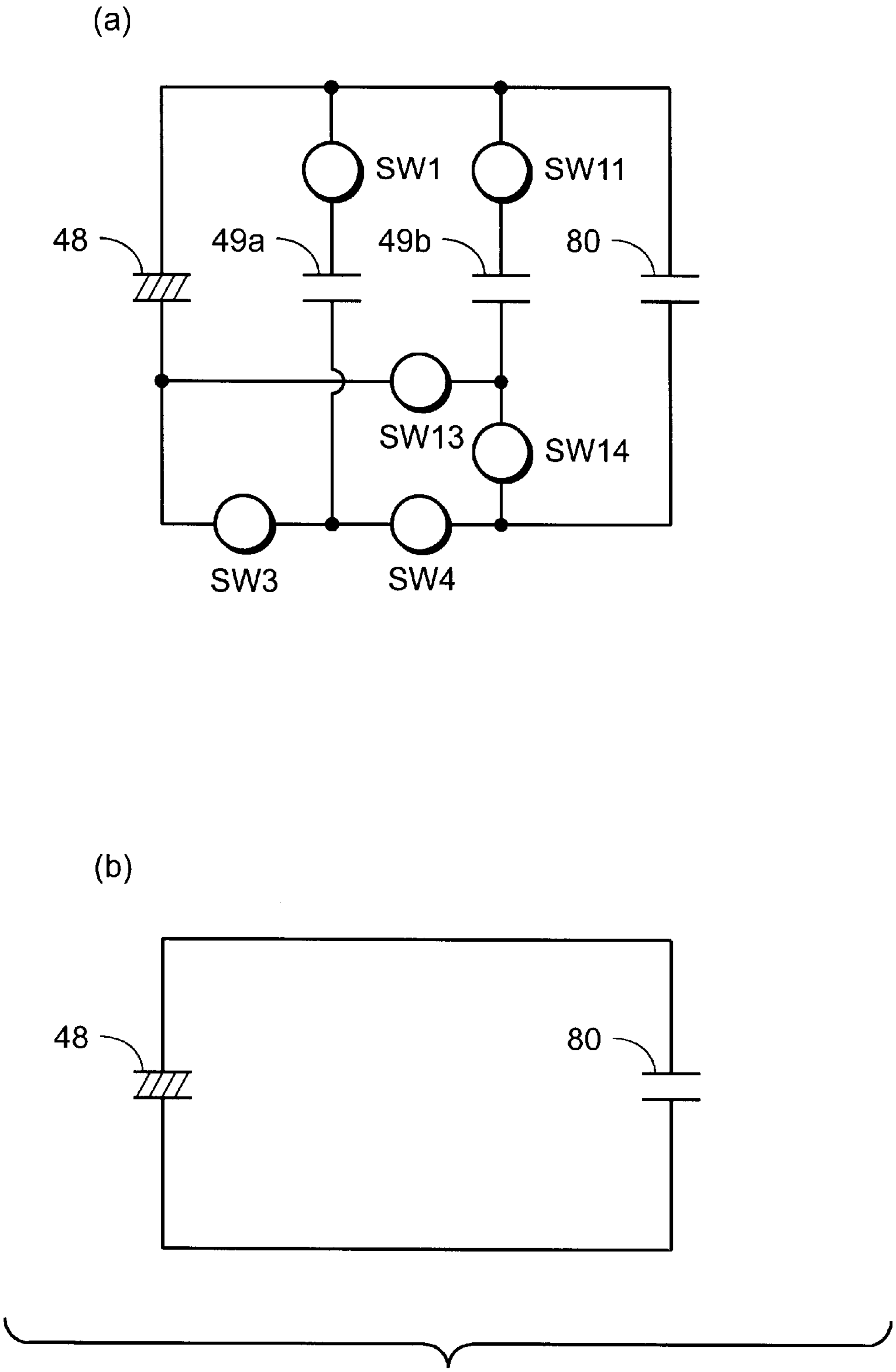
FIG. 7 includes a circuit diagram and an equivalent circuit diagram when a voltage is ×1 boosted (shorting mode).

In this case, the connection state of the step-up/down circuit 49 is as shown in FIG. 7(*a*), and the equivalent circuit is as shown in FIG. 7(*b*). The step-up/down circuit 49 is in a state in which the large-capacity secondary power supply 48 is directly coupled to the auxiliary capacitor 80.

[1.2.2.1.5] Stepping-down by ½

The step-up/down circuit 49 operates based on the step-up/down clock CKUD generated by the limiter/step-up/down control circuit 105 (see FIG. 11) using the clock signal CK from the clock generating circuit 104 (see FIG. 11). In stepping-down by ½, as shown in FIG. 3, at the first step-up/down clock timing (parallel connection timing), the switch SW1 is turned on, the switch SW2 is turned off, the switch SW3 is turned off, the switch SW4 is turned off, the switch SW11 is turned off, the switch SW12 is turned off, the switch SW13 is turned on, the switch SW14 is turned off, and the switch SW21 is turned on.

Figure 8:
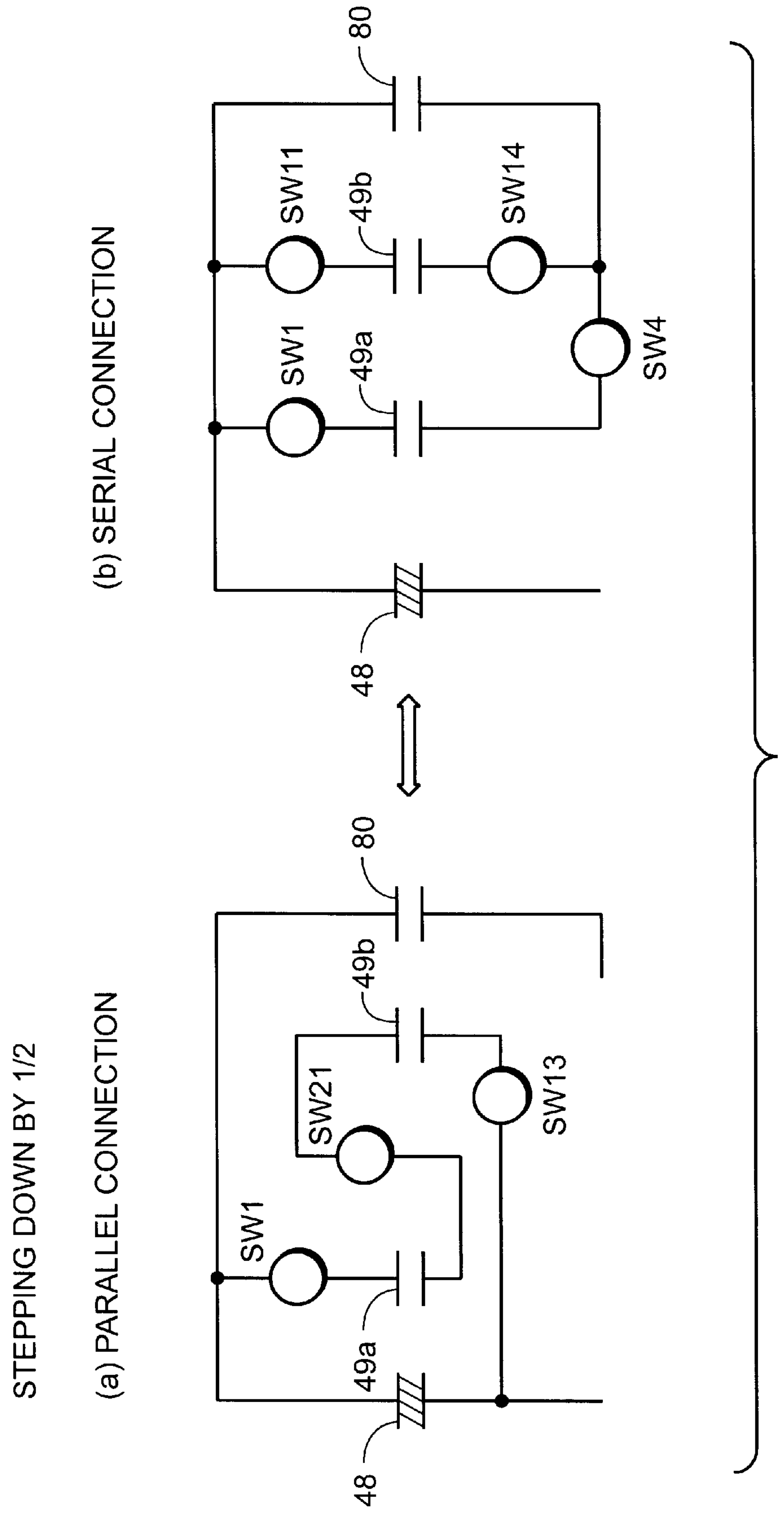
FIG. 8 includes equivalent circuit diagrams when a voltage is stepped-down by ½.

In this case, the equivalent circuit of the step-up/down circuit 49 is as shown in FIG. 8(*a*). Power is supplied from the large-capacity secondary power supply 48 to the capacitor 49*a* and the capacitor 49*b*, which are connected in series. Charging is performed until the voltages of the capacitor 49*a* and the capacitor 49*b* become substantially equal to half the voltage of the large-capacity secondary power supply 48.

At the second step-up/down clock timing (serial connection timing), the switch SW1 is turned on, the switch SW2 is turned off, the switch SW3 is turned off, the switch SW4 is turned on, the switch SW11 is turned on, the switch SW12 is turned off, the switch SW13 is turned off, the switch SW14 is turned on, and the switch SW21 is turned off.

In this case, the equivalent circuit of the step-up/down circuit 49 is as shown in FIG. 8(*b*). The capacitor 49*a* and the capacitor 49*b* are connected in parallel. The auxiliary capacitor 80 is charged by a voltage half the voltage of the large-capacity secondary power supply 48, thus performing stepping-down by ½.

[1.2.2.1.6] ×1 Boosting (No Stepping-up/down; Charge Transfer Mode)

A charge transfer mode, which is a characteristic of the present invention, is described.

The charge transfer mode is described as follows. In the transition from a state in which a central control circuit 93 (see FIG. 10; corresponding to non-stepping-up/down transfer control means) transfers charge (that is, electrical energy) from the large-capacity secondary power supply 48 (corresponding to first power supply means) to the auxiliary capacitor 80 (corresponding to second power supply means) via the step-up/down circuit 49 (corresponding to power supply step-up/down means) by a step-up/down multiplying factor M' (M' is a positive real number except for 1, and in the above examples, M=3, 2, 1.5, ½) to a state in which the large-capacity secondary power supply 48 is electrically directly coupled to the auxiliary capacitor 80, that is, to the above-described ×1 boosting state (no stepping-up/down; shorting mode), charge is transferred from the large-capacity secondary power supply 48 to the auxiliary capacitor 80 via the step-up/down circuit 49 in a non-stepping-up/down state by the step-up/down multiplying factor M=1.

The reason for providing the charge transfer mode is as follows. Electrical energy generated by the power generator is accumulated in the large-capacity secondary power supply 48. The power is accumulated by the auxiliary capacitor 80 via the step-up/down circuit 49 including the step-up/down capacitors 49*a* and 49*b* for increasing or decreasing the voltage of the large-capacity secondary power supply 48. Then, the auxiliary capacitor 80 supplies the power. In the transition from the step-up/down state in which the voltage is increased or decreased by the step-up/down capacitors 49*a* and 49*b* to the direct coupling state (shorting mode) in which the large-capacity power supply and the small-capacity power supply are directly coupled without increasing or decreasing the voltage, charge (electrical energy) may suddenly transfer from the large-capacity secondary power supply side to the auxiliary capacitor 80 or from the auxiliary capacitor 80 side to the large-capacity secondary power supply side in accordance with a relative voltage relationship between the large-capacity secondary power supply 48 and the auxiliary capacitor 80. This may generate a sudden variation in the voltage supplied to the drive circuit of the small-capacity power supply. Hence, malfunctioning may occur in the seconds-hand driver 30S, the hour/minute-hand driver 30HM (corresponding to driven means), and the control circuit 23.

In the charge transfer mode, when shifting from the state in which charge is transferred to the auxiliary capacitor 80 by the step-up/down multiplying factor M' to the shorting mode in which the large-capacity secondary power supply 48 and the auxiliary capacitor 80 are electrically directly coupled, the charge is transferred without using the step-up/down capacitors 49*a* and 49*b* to increase or decrease the voltage. The voltage is gradually shifted to the voltage in the shorting mode. Hence, a sudden variation in the power supply voltage is suppressed, preventing malfunctioning in the seconds-hand driver 30S, the hour/minute-hand driver 30HM, and the control circuit 23.

More specifically, the step-up/down circuit 49 operates based on the step-up/down clock CKUD generated by the limiter/step-up/down control circuit 105 (see FIG. 11) using the clock signal CK from the clock generating circuit 104 (see FIG. 11). The charge transfer mode includes a charging cycle and a charge transfer cycle.

In the charging cycle, as shown in FIG. 3(*b*), at the first step-up/down clock timing (parallel connection timing), the switch SW1 is turned on, the switch SW2 is turned off, the switch SW3 is turned on, the switch SW4 is turned off, the switch SW11 is turned on, the switch SW12 is turned off, the switch SW13 is turned on, the switch SW14 is turned off, and the switch SW21 is turned off.

Figure 9:
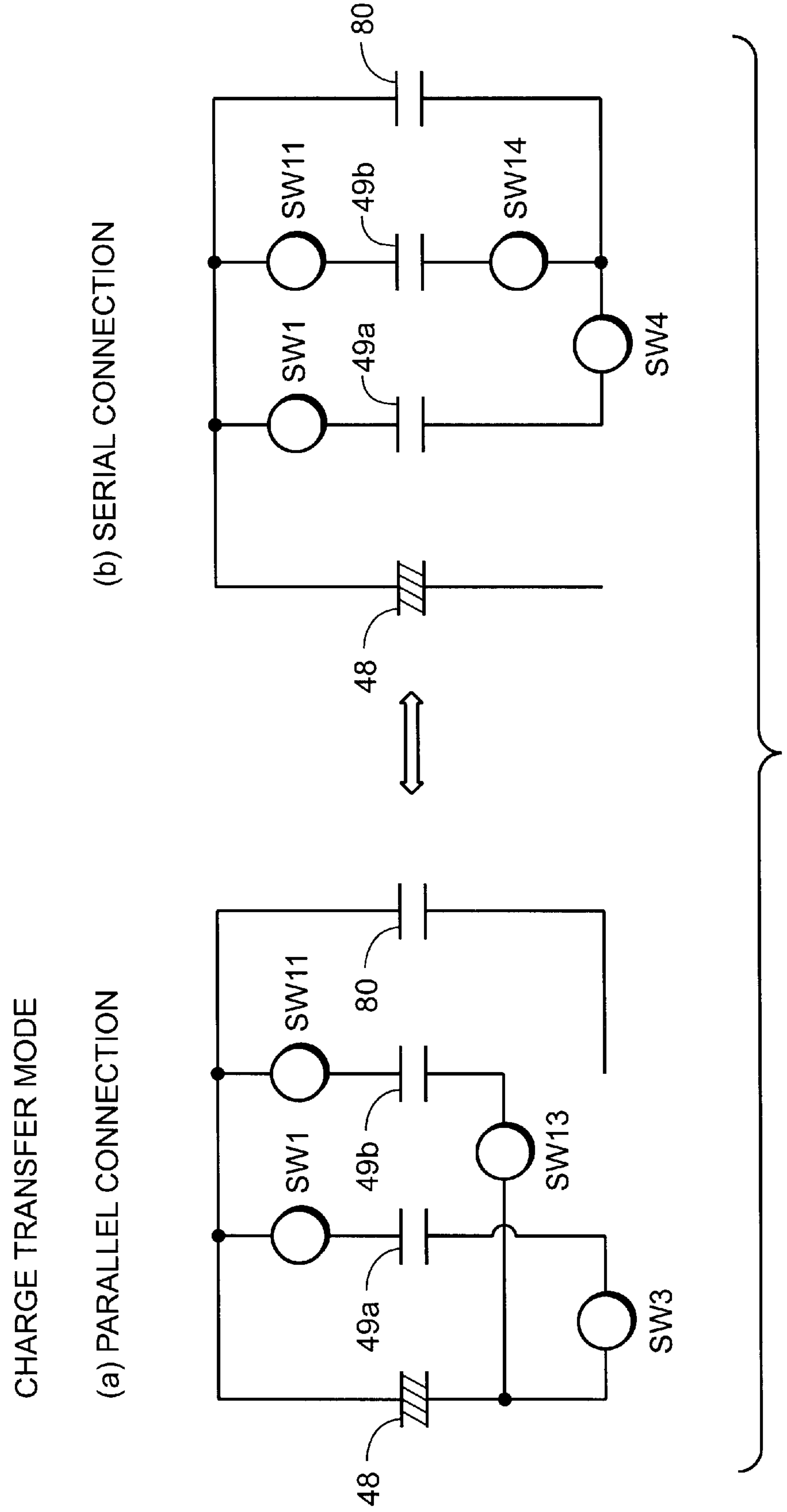
FIG. 9 includes equivalent circuit diagrams when a voltage is ×1 boosted (charge transfer mode).

In this case, the equivalent circuit of the step-up/down circuit 49 is as shown in FIG. 9(*a*). The capacitor 49*a* and the capacitor 49*b* are connected in parallel to the large-capacity secondary power supply 48. The voltage of the large-capacity secondary power supply 48 is used to charge the capacitor 49*a* and the capacitor 49*b*.

In the charge transfer cycle, as shown in FIG. 3(*b*), at the second step-up/down clock timing (serial connection timing), the switch SW1 is turned on, the switch SW2 is turned off, the switch SW3 is turned off, the switch SW4 is turned on, the switch SW11 is turned on, the switch SW12 is turned off, the switch SW13 is turned off, the switch S14 is turned on, and the switch SW21 is turned off.

In this case, the equivalent circuit of the step-up/down circuit 49 is as shown in FIG. 9(*b*). The capacitor 49*a* and the capacitor 49*b* are connected in parallel to the auxiliary capacitor 80. The voltages of the capacitor 49*a* and the capacitor 49*b*, i.e., the voltage of the large-capacity secondary power supply 48, are employed to charge the auxiliary capacitor 80, and the charge is transferred.

When the charging state of the auxiliary capacitor 80 progresses, reaching the voltage in which a variation in the power supply voltage will be small when the state is shifted to the shorting mode, the state is shifted to the shorting mode. Accordingly, a sudden variation in the power supply voltage is suppressed, thus preventing malfunctioning in the seconds-hand driver 30S, the hour/minute-hand driver 30HM, and the control circuit 23.

In the charge transfer mode, a state transition period between the parallel connection and the serial connection is set in inverse proportion to the magnitude of the power consumption. For example, when the power consumption is doubled, the state transition period is reduced to half. When the power consumption is tripled, the state transition period is reduced to a third. Therefore, a period of time until a voltage-stabilized state is held constant despite the magnitude of the power consumption.

When the magnitude of the power consumption is great, the state transition period may be shortened in order to improve the charge (electrical energy) supplying ability. Hence, the power supply voltage is stabilized.

More specifically, in a single charge transfer cycle, transferable electrical energy is expressed by Q0, the number of transfers per unit time is expressed by N, and necessary power consumption per unit time is expressed by QDRV. Then, the number N of transfers per unit time can be computed so as to satisfy the following expression, thereby obtaining the state transition period.

$$QDRV \leqq Q0 \times N$$

Similarly, the state transition period between the parallel connection and the serial connection can be changed in accordance with the capacitances of the capacitor 49*a* and the capacitor 49*b*.

In other words, the control circuit 23 can be constructed as follows. A power consumption detecting unit 106 detects power consumed by driven units that are actually being driven among all driven units including the seconds-hand driver 30S and the hour/minute-hand driver 30HM. The clock signal CK is generated by the clock generating circuit 104 (see FIG. 11) based on the detected power consumption and an output pulse signal from a pulse synthesis circuit 22. Based on the clock signal CK, the limiter/step-up/down control circuit 105 (see FIG. 11) generates the step-up/down clock CKUD corresponding to the number of transfers, and outputs the step-up/down clock CKUD to the step-up/down circuit 49.

Alternatively, a built-in decoder in the clock generating circuit 104 (see FIG. 11) selects a necessary output pulse signal from among a plurality of output pulse signals output from the pulse synthesis circuit 22 based on the power consumption detected by the power consumption detecting unit 106. The clock generating circuit 104 generates the clock signal CK based on the selected output pulse signal. Based on the clock signal CK, the limiter/step-up/down control circuit 105 (see FIG. 11) generates the step-up/down clock CKUD corresponding to the number of transfers. The step-up/down clock CKUD is then output to the step-up/down circuit 49. The decoder is not necessarily included in the clock generating circuit 104. The decoder can be provided as a circuit independent of the clock generating circuit 104 between the clock generating circuit 104 and the power consumption detecting unit 106. The decoder can be included in the power consumption detecting unit 106.

As an alternative to the power consumption detecting unit 106, a power consumption storage determining unit 106 may be provided in order to specify the unit that is currently consuming power. The relationship with the number of transfers in accordance with the pre-stored power consumption of the unit and the capacitances of the capacitor 49*a* and the capacitor 49*b* is stored in the form of data tables. Based on the stored data, the power consumption storage determining unit 106 reads the corresponding number of transfers. Based on the read number of transfers and the clock signal CK generated by the clock generating circuit 104 (see FIG. 11), the limiter/step-up/down control circuit 105 (see FIG. 11) generates the step-up/down clock CKUD corresponding to the number of transfers, and outputs the step-up/down clock CKUD to the step-up/down circuit 49.

As a result, the charge (electrical energy) supplying ability is improved in accordance with the capacitances of the capacitor 49*a* and the capacitor 49*b*. Hence, the power supply voltage is stabilized.

[1.2.3] Carrying Mechanism

Next, the carrying mechanisms CS and CHM are described.

[1.2.3.1] Seconds-hand Carrying Mechanism

First, the seconds-hand carrying mechanism CS is described.

The stepping motor 10 used in the seconds-hand carrying mechanism CS is a motor, widely used as an actuator for a digital control device, which is driven by a pulse signal. This motor is referred to as a pulse motor, a stepping motor, a stepper motor, or a digital motor. Recently, small and light-weight stepping motors have been widely employed as actuators for portable, small electronic devices or information devices. Typical electronic devices are timepieces including electronic watches, time switches, and chronographs.

The stepping motor 10 of the present embodiment includes a drive coil 11 for generating magnetic force by a drive pulse supplied from the seconds-hand driver 30S, a stator 12 excited by the drive coil 11, and a rotor 13 rotated by a magnetic field excited in the stator 12.

The stepping motor 10 is a PM type (permanent magnet rotating type) in which the rotor 13 is formed by a disk-shaped bipolar permanent magnet.

The stator 12 is provided with a magnetically-saturated part 17 so that different magnetic poles are generated by the magnetic force by the drive coil 11 at phases (poles) 15 and 16 around the rotor 13.

In order to determine the rotating direction of the rotor 13, the stator 12 is provided with an inner notch 18 at an appropriate position of the inside perimeter thereof. Hence, a cogging torque is generated to stop the rotor 13 at an appropriate position.

The rotation of the rotor 13 in the stepping motor 10 is transferred to the seconds hand 53 via a wheel train 50 including an intermediate seconds wheel 51 and a seconds wheel (seconds indicating wheel) 52 which are engaged with the rotor 13 via a pinion, thus indicating the seconds.

[1.2.3.2] Hour/minute-hand Carrying Mechanism

Next, the hour/minute-hand carrying mechanism CHM is described.

A stepping motor 60 used in the hour/minute-hand carrying mechanism CHM has the same structure as that of the stepping motor 10.

The stepping motor 60 of the present embodiment includes a drive coil 61 for generating magnetic force by a drive pulse supplied from the hour/minute-hand driver 30HM, a stator 62 excited by the drive coil 61, and a rotor 63 rotated by a magnetic field excited in the stator 62.

The stepping motor 60 is a PM type (permanent magnetic rotating type) in which the rotor 63 is formed by a disk-shaped bipolar permanent magnet. The stator 62 is provided with a magnetically-saturated part 67 so that different magnetic poles are generated by the magnetic force by the drive coil 61 at phases (poles) 65 and 66 around the rotor 63. In order to determine the rotating direction of the rotor 63, the stator 62 is provided with an inner notch 68 at an appropriate position of the interior perimeter thereof. Hence, a cogging torque is generated to stop the rotor 63 at an appropriate position.

The rotation of the rotor 63 in the stepping motor 60 is transferred to each hand by a wheel train 70 including a fourth wheel 71, a third wheel 72, a center wheel (minute indicating wheel) 73, a minute wheel 74, and an hour wheel (hour indicating wheel) 75 which are engaged with the rotor 63 via a pinion. The minute hand 76 is connected to the center wheel 73, and the hour hand 77 is connected to the hour wheel 75. Each hand interlocks with the rotation of the rotor 63 and indicates the hour and the minute.

Of course, a transfer system (not shown) for indicating date/month/year (calendar) can be connected to the wheel train 70. (For example, when indicating a date, the transfer system may include an intermediate hour wheel, an intermediate date wheel, a date indicator driving wheel, and a date indicator.) In this case, a calendar correcting system wheel train (for example, a first calendar correcting transfer wheel, a second calendar correcting transfer wheel, a calendar corrector setting wheel, and the date indicator) may be provided.

[1.2.4] Seconds-hand Driver and Hour/minute-hand Driver

Next, the seconds-hand driver 30S and the hour/minute-hand driver 30HM are described. Since the seconds-hand driver 30S and the hour/minute-hand driver 30HM have the same structures, only the seconds-hand driver 30S is described.

The seconds-hand driver 30S supplies the stepping motor 10 with various drive pulses under the control of the controller 23.

The seconds-hand driver 30S includes a bridge circuit formed by a p-channel MOS 33*a* and an n-channel MOS 32*a*, which are connected in series, and a p-channel MOS 33*b* and an n-channel MOS 32*b*, which are connected in series.

The seconds-hand driver 30S further includes rotation detecting resistors 35*a* and 35*b* which are connected in parallel to the p-channel MOSs 33*a* and 33*b*, respectively, and sampling p-channel MOSs 34*a* and 34*b* for supplying the resistors 35*a* and 35*b*, respectively, with chopping pulses. The controller 23 applies control pulses having different polarities and pulse durations at different timings to gate electrodes of the MOSs 32*a*, 32*b*, 33*a*, 33*b*, 34*a*, and 34*b*. Therefore, the drive coil 11 is supplied with drive pulses having different polarities. Alternatively, detection pulses for exciting an induced voltage to detect the rotation and the magnetic field of the rotor 13 are supplied.

[1.2.5] Control Circuit

Next, the structure of the control circuit 23 is described with reference to FIGS. 10 and 11.

Figure 10:
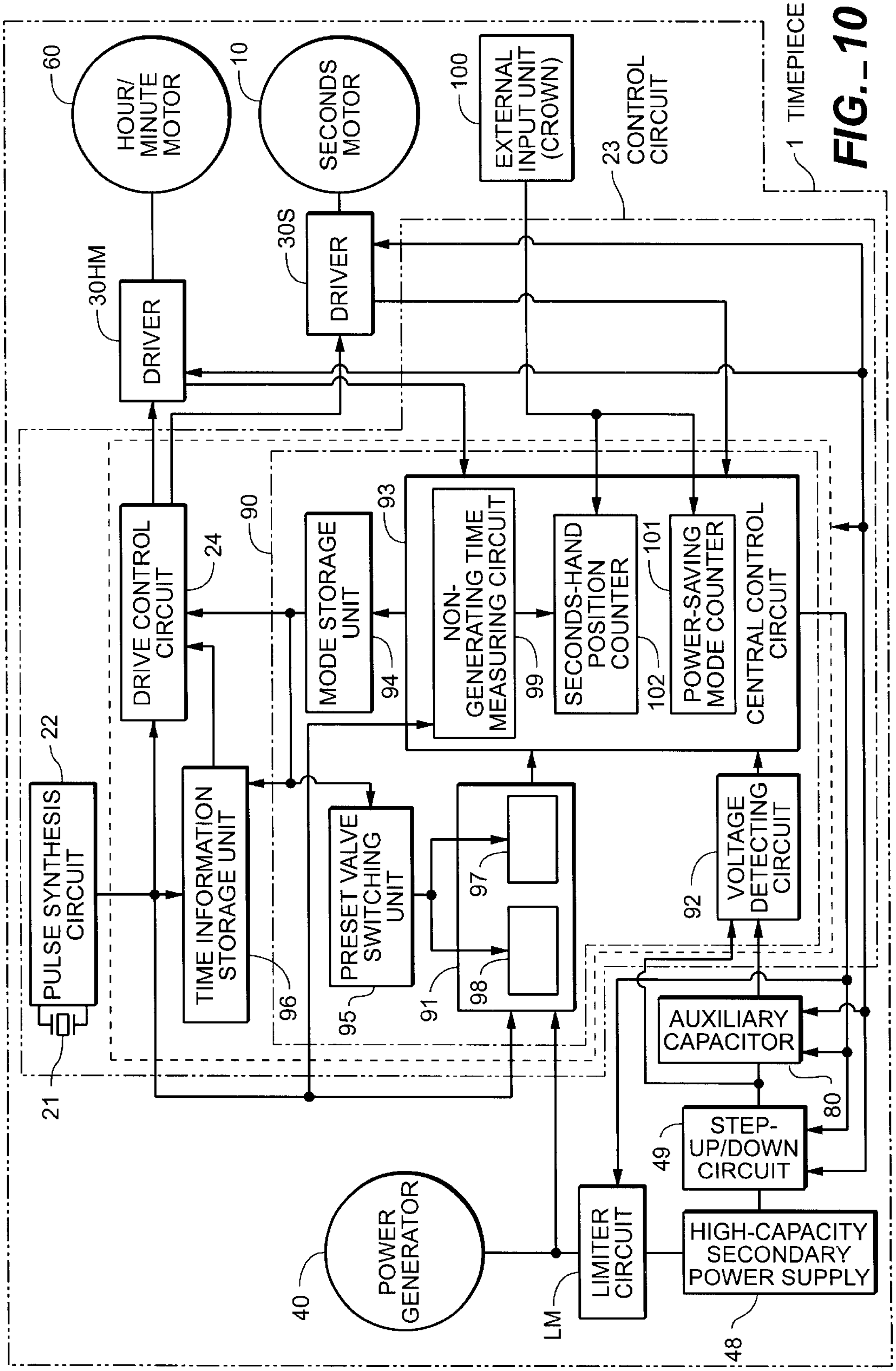
FIG. 10 is a block diagram of the schematic structure of a controller and its surrounding portions according to the first embodiment.

FIG. 10 shows a block diagram of the schematic structure of the control circuit 23 and its surrounding portions (including the power supply). FIG. 11 shows a block diagram of the structure of basic portions.

The control circuit 23 is roughly divided into the pulse synthesis circuit 22, a mode setting unit 90, a time information storage unit 96, and a drive control circuit 24.

The pulse synthesis circuit 22 includes an oscillation circuit for oscillating a reference pulse of a stable frequency using a reference oscillating source 21, such as a crystal oscillator, and a synthesis circuit for combining a divided pulse, obtained by dividing the reference pulse, and the reference pulse, thus generating pulse signals having different pulse durations and timings.

The mode setting unit 90 includes a power generation state detector 91; a preset value switching unit 95 for switching a preset value used to detect the power generation state; a voltage detecting circuit 92 for detecting a charging voltage VC of the large-capacity secondary power supply 48 and an output voltage of the step-up/down circuit 49; the central control circuit 93 for controlling the time-indicating mode in accordance with the power generation state and for controlling the boost multiplying factor based on the charging voltage; and a mode storage unit 94 for storing modes.

The power generation state detector 91 includes a first detection circuit 97 for comparing an electromotive voltage Vgen of the power generator 40 with a preset voltage value Vo and determining whether power generation is detected, and a second detection circuit 98 for comparing a power generation duration Tgen in which the electromotive voltage Vgen equal to or greater than a preset voltage value Vbas that is significantly smaller than the preset voltage value Vo is obtained with a preset time value To and determining whether power generation is detected. When one of the conditions of the first detection circuit 97 and the second detection circuit 98 is satisfied, the power generation state is detected, and a power generation detection signal SPDET is output. Here, the preset voltage values Vo and Vbas are negative voltages based on the reference Vdd (that is, GND), indicating potential differences from Vdd.

[1.2.5.1] First and Second Detection Circuits

The structures of the first detection circuit 97 and the second detection circuit 98 are described with reference to FIG. 12.

Figure 12:
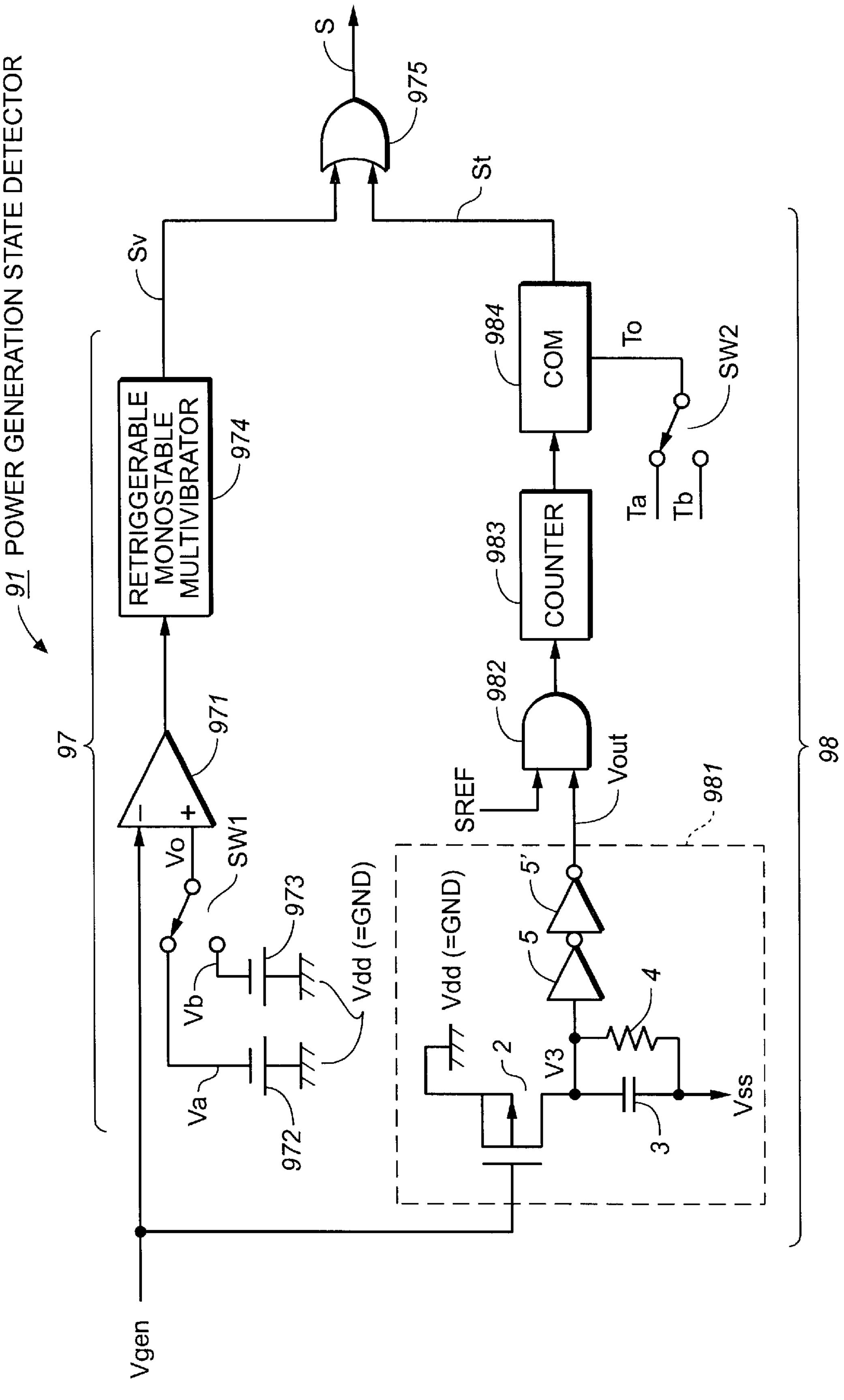
FIG. 12 is a block diagram of the detailed structure of a power generation state detector.

In FIG. 12, the first detection circuit 97 includes a comparator 971, a reference voltage source 972 for generating a constant voltage Va, a reference voltage source 973 for generating a constant voltage Vb, the switch SW1, and a retriggerable monostable multivibrator 974.

A generated voltage value of the reference voltage source 972 is the preset voltage value Va in the indicating mode, whereas a generated voltage value of the reference voltage source 973 is the preset voltage value Vb in the power-saving mode. The reference voltage sources 972 and 973 are connected to a positive input terminal of the comparator 971 via the switch SW1. The switch SW1 is controlled by the preset value switching unit 95. In the indicating mode, the switch SW1 connects the reference voltage source 972 to the positive input terminal of the comparator 971. In the power-saving mode, the switch SW1 connects the reference voltage source 973 to the positive input terminal of the comparator 971. The electromotive voltage Vgen of the power generating unit A is applied to a negative input terminal of the comparator 971. Therefore, the comparator 971 compares the electromotive voltage Vgen with the preset voltage value Va or the preset voltage value Vb. The comparator 971 generates a comparison result signal which becomes an "H" level when the electromotive voltage Vgen is less than these values (high amplitude) and which becomes an "L" level when the electromotive voltage Vgen is greater than these values (low amplitude).

The retriggerable monostable multivibrator 974 is triggered at a rising edge generated when the comparison result signal rises from the "L" level to the "H" level. Hence, the retriggerable monostable multivibrator 974 rises from the "L" level to the "H" level. After a predetermined period of time, the retriggerable monostable multivibrator 974 generates a signal rising from the "L" level to the "H" level. When triggered again before the predetermined period of time elapses, the retriggerable monostable multivibrator 974 resets the measured time and restarts the measuring time.

Next, the operation of the first detection circuit 97 is described.

When the current mode is the indicating mode, the switch SW1 selects the reference voltage source 972 and supplies the comparator 971 with the preset voltage value Va. The comparator 971 then compares the preset voltage value Va with the electromotive voltage Vgen and generates the comparison result signal. In this case, the retriggerable monostable multivibrator 974 rises from the "L" level to the "H" level in synchronism with the rising edge of the comparison result signal.

In contrast, when the current mode is the power saving mode, the switch SW1 selects the reference voltage source 973 and supplies the comparator 971 with the preset voltage value Vb. In this case, the electromotive voltage Vgen does not exceed the preset voltage value Vb, and the retriggerable monostable multivibrator 974 is not triggered. Therefore, a voltage detection signal Sv is maintained at a low level.

Accordingly, the first detection circuit 97 compares the electromotive voltage Vgen with the preset voltage value Va or Vb in accordance with the mode, and generates the voltage detection signal Sv.

In FIG. 12, the second detection signal 98 includes an integrating circuit 981, a gate 982, a counter 983, a digital comparator 984, and the switch SW2.

The integrating circuit 981 includes a MOS transistor 2, a capacitor 3, a pull-up resistor 4, an inverter circuit 5, and an inverter circuit 5'.

The electromotive voltage Vgen is connected to the gate of the MOS transistor 2. The MOS transistor 2 is repetitively turned on and off by the electromotive voltage Vgen, thus controlling charging of the capacitor 3. When switching means is formed by a MOS transistor, the integrating circuit 981 including the inverter circuit 5 can be formed by an inexpensive CMOS-IC. Alternatively, the switching device and the voltage detection means can be formed by a bipolar transistor. The pull-up resistor 4 serves to fix a voltage value V3 of the capacitor 3 at the Vss potential when power is not generated, and to generate a leakage current when power is not generated. The pull-up resistor 4 has a high resistance value ranging from tens to hundreds of Ω. The pull-up resistor 4 can be formed by a MOS transistor having a large on-resistance. The voltage value V3 of the capacitor 3 is determined by the inverter circuit 5 connected to the capacitor 3, and the output of the inverter circuit 5 is inverted, thus outputting a detection signal Vout. A threshold of the inverter circuit 5 is set to the preset voltage value Vbas that is significantly smaller than the preset value Vo used in the first detection circuit 97.

The gate 982 is supplied with a reference signal SREF from the pulse synthesis circuit 22 and the detection signal Vout. When the detection signal Vout is at the high level, the counter 983 counts the reference signal SREF. The count value is fed to one input of the digital comparator 983. The preset time value To corresponding to the preset time is fed to the other input of the digital comparator 983. When the current mode is the indicating mode, a preset time value Ta is supplied via the switch SW2. When the present mode is the power-saving mode, a preset time value Tb is supplied via the switch SW2. The switch SW2 is controlled by the preset value switching unit 95.

The digital comparator 984 outputs the comparison result as a power generation duration detection signal St in synchronism with a falling edge of the detection signal Vout. When the power generation duration detection signal St exceeds the preset time, it becomes the "H" level. In contrast, when the power generation duration detection signal St falls below the preset time, it becomes the "L" level.

Next, the operation of the second detection circuit 98 is described. When the power generating unit A starts generating the AC power, the power generator 40 generates the electromotive voltage Vgen through the diode 47.

When the power generation begins and the voltage value falls from Vdd to Vss, the MOS transistor 2 is turned on, and charging of the capacitor 3 starts. When power is not generated, the potential of V3 is fixed to the Vss side by the pull-up resistor 4. When power is generated, and the charging of the capacitor 3 starts, the potential of V3 rises to the Vdd side. When the voltage of the electromotive voltage Vgen is increased to Vss, and the MOS transistor 2 is turned off, the charging of the capacitor 3 is stopped. In contrast, the potential of V3 is maintained. The above operation is repeated as long as power is generated. The potential of V3 is increased to Vdd and is stabilized. When the potential of V3 exceeds the threshold of the inverter circuit 5, the detection signal Vout, that is, the output of the inverter circuit 5', is switched from the "L" level to the "H" level, thus detecting that power is generated. A response time until detection of power generation is arbitrarily set by connecting a current limiting resistor, by changing the capacity of the MOS transistor and adjusting the charging current value of the capacitor 3, or by changing the capacitance of the capacitor 3.

When power generation is stopped, the electromotive voltage Vgen is stabilized at the Vdd level. The MOS transistor 2 is maintained in an off state. The voltage of V3 is maintained by the capacitor 3 for a while. A slight leakage current by the pull-up resistor 4 causes the charge of the capacitor 3 to drop out. Hence, V3 gradually falls from Vdd to Vss. When V3 crosses the threshold of the inverter circuit 5, the detection signal Vout, that is, the output of the inverter circuit 5', is switched from the "H" level to the "L" level, detecting that power is not generated. The response time is arbitrarily set by changing the resistance of the pull-up resistor 4 or by adjusting the leakage current of the capacitor 3.

When the detection signal Vout is gated by the gate 982 using the reference signal, it is counted by the counter 983. The digital comparator 984 compares the count value with a value corresponding to a preset time at a timing T1. When a high level period Tx of the detection signal Vout is longer than the preset time value To, the power generation duration detection signal St is changed from the "L" level to the "H" level.

The electromotive voltage Vgen according to differences in the rotating speed of the power generating rotor 43 and the detection signal Vout with respect to the electromotive voltage Vgen are described.

The voltage level and the period (frequency) of the electromotive voltage Vgen vary in accordance with the rotating speed of the power generating motor 43. Specifically, the higher the rotating speed, the larger the amplitude of the electromotive voltage Vgen becomes, and the shorter the period becomes. Therefore, the period of output maintaining time (power generation duration) of the detection signal Vout varies in accordance with the rotating speed of the power generating rotor 43, that is, the magnitude of the power generation of the power generator 40. In other words, when the rotating speed of the power generating rotor 43 is low, that is, when the power generation is small, the output maintaining time is ta. When the rotating speed of the power generating rotor 43 is high, that is, when power generation is large, the output maintaining time is tb. The magnitude relationship between the two is ta<tb. Accordingly, the magnitude of the power generation by the power generator 40 can be understood using the period of the output maintaining time of the detection signal Vout.

In this case, the preset voltage value Vo and the preset time value To are switched and controlled by the preset value switching unit 95. When the indicating mode in which the time is indicated is shifted to the power-saving mode in which the time is not indicated (however, the control circuit and the like are in operation) by stopping the seconds-hand driver 30S and the hour/minute-hand driver 30HM, the preset value switching unit 95 changes the preset values Vo and To of the first and second detection circuits 97 and 98 in the power-generation detecting circuit 91.

In this example, concerning the preset values Va and Ta in the indicating mode, values less than the preset values Vb and Tb in the power-saving mode are set. Therefore, it is necessary to generate large power in order to switch from the power-saving mode to the indicating mode. Concerning the degree of such power generation, the degree obtained by normally carrying the timepiece 1 is not sufficient. The user is thus required to shake the hand to forcedly generate power. In other words, the preset values Vb and Tb in the power-saving mode are set so as to detect the forced charging by shaking the hand.

The central control circuit 93 includes a non-generating time measuring circuit 99 for measuring a non-generating time Tn in which power generation is not detected by the first and second detection circuits 97 and 98. When the non-generating time exceeds a predetermined period of time, the indicating mode is shifted to the power-saving mode.

In contrast, the transition from the power-saving mode to the indicating mode is performed when the power generation state detector 91 detects that the power generating unit A is in the power generation state and that the charging voltage VC of the large-capacity secondary power supply 48 is sufficient.

In this case, in the transition to the power-saving mode, when the limiter circuit LM is in operation and in an on (closed) state, the power generating unit A is shorted. Since no electrical information of the power generating unit A is transmitted to the subsequent stage, the power generation state detector 91 cannot detect the power generation state even when the power generating unit A is in the power generation state. Hence, it is impossible to shift the mode from the power-saving mode to the indicating mode.

According to the present embodiment, when the operation mode is the power-saving mode, the limiter circuit LM is turned off (closed) despite the power generation state of the power generating unit A. Hence, the power generation state detector 91 can reliably detect the power generation state of the power generating unit A.

The voltage detecting circuit 92 includes a limiter-on voltage detecting circuit 92A for determining whether to activate the limiter circuit LM by comparing the charging voltage VC of the large-capacity secondary power supply 48 or a charging voltage VC1 of the auxiliary capacitor 80 with a preset limiter-on reference voltage VLMON, and for outputting a limiter-on signal SLMON; a pre-voltage detecting circuit 92B for determining whether to activate the limiter-on voltage detecting circuit 92A by comparing the charging voltage VC of the large-capacity secondary power supply 48 or the charging voltage VC1 of the auxiliary capacitor 80 with a preset limiter circuit operation reference voltage (hereinafter referred to as a pre-voltage) VPRE, and for outputting a limiter enabling signal SLMEN; and a power supply voltage detecting circuit 92C for detecting the charging voltage VC of the large-capacity secondary voltage 48 or the charging voltage VC1 of the auxiliary capacitor 80 and outputting a power supply voltage detection signal SPW.

In this case, the limiter-on voltage detecting circuit 92A employs the circuit structure in which highly accurate voltage detection is performed compared with the pre-voltage detection circuit 92B. Hence, the circuit structure of the limiter-on voltage detecting circuit 92A is increased in size with respect to the pre-voltage detecting circuit 92B, thus consuming more power.

The detailed structures and the operations of the limiter-on voltage detecting circuit 92A, the pre-voltage detecting circuit 92B, and the limiter circuit LM are described with reference to FIGS. 13 and 14.

Figure 13:
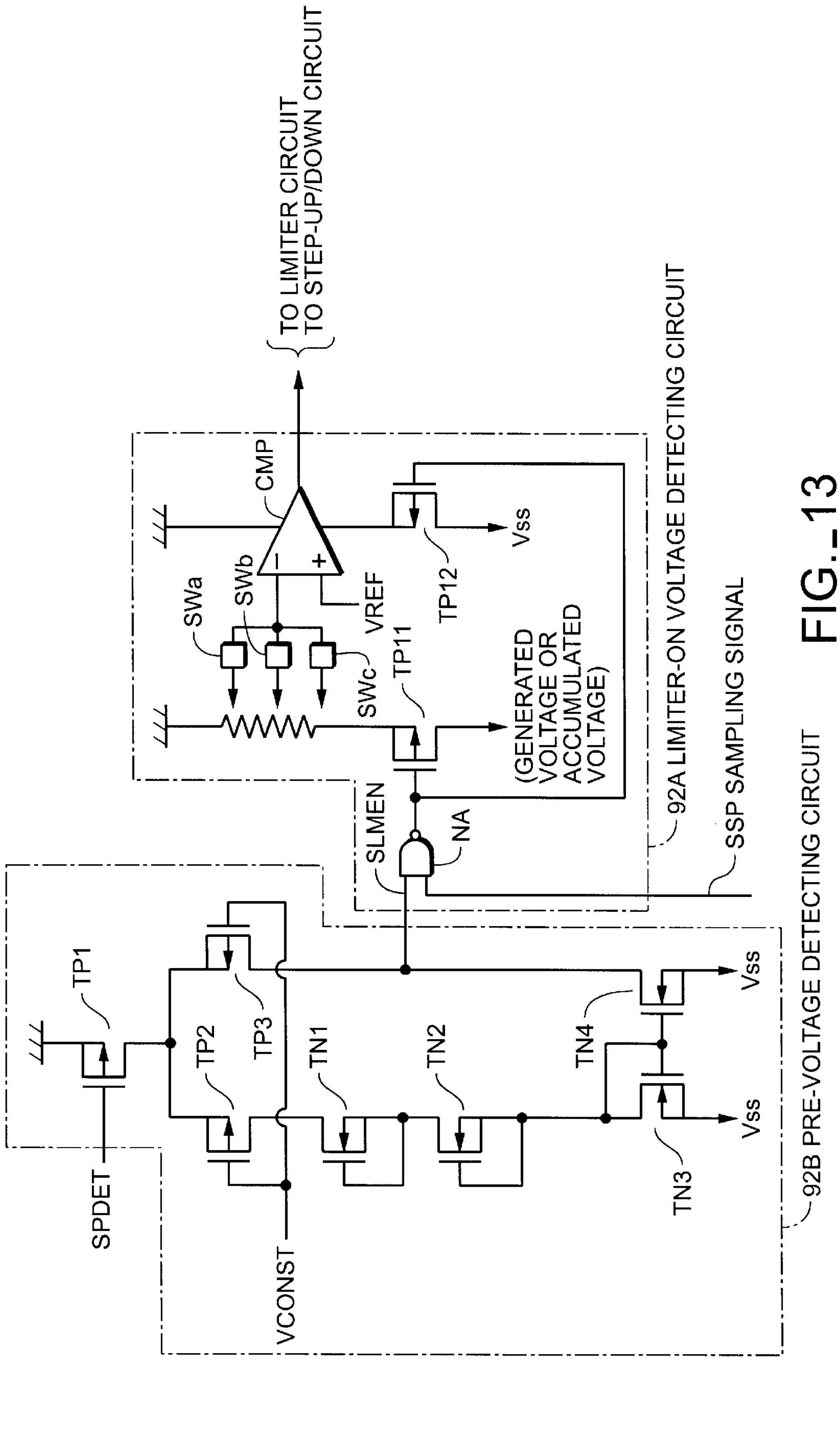
FIG. 13 is a block diagram of the detailed structures of a limiter-on voltage detecting circuit and a pre-voltage detecting circuit.

As shown in FIG. 13, the pre-voltage detecting circuit 92B includes a p-channel transistor TP1 having the drain connected to Vdd (high voltage side), which enters an on-state in the power generation state based on the power generation state detection signal SPDET output from the power generation detecting circuit 91; a p-channel transistor TP2 having the drain connected to the source of the p-channel transistor TP1, in which a predetermined constant voltage VCONST is applied to the gate; a p-channel transistor TP3 having the drain connected to the source of the p-channel transistor TP1, in which the predetermined constant voltage VCONST is applied to the gate, and which is connected in parallel to the p-channel transistor TP2; an n-channel transistor TN1 having the source connected to the source of the p-channel transistor TP2, in which the gate and the drain are commonly connected; an n-channel transistor TN2 having the source connected to the drain of the n-channel transistor TN1, in which the gate and the drain are commonly connected; an n-channel transistor TN3 having the source connected to the drain of the n-channel transistor TN2, in which the gate and the source are commonly connected, and the drain is connected to Vss (low voltage side); and an n-channel transistor TN4 having the source connected to the source of the p-channel transistor TP3, in which the gate is commonly connected to the gate of the n-channel transistor TN3, and the drain is connected to Vss (low voltage side).

In this case, the n-channel transistor TN3 and the n-channel transistor TN4 form a current mirror circuit.

The pre-voltage detecting circuit 92B is activated in response to the power generation state detection signal SPDET indicating that power generation is detected by the power generation detecting circuit 91.

Concerning the basic operation, the circuit structure uses a potential difference resulting from unbalanced capacity of an operating pair of transistors as a detection voltage.

Specifically, a potential difference resulting from the capacity unbalance between a first transistor group including the p-channel transistor TP2, the n-channel transistor TN1, the n-channel transistor TN2, and the n-channel transistor TN3 and a second transistor group including the p-channel transistor TP3 and the n-channel transistor TN4 is detected.

Accordingly, it is determined whether to output the limiter enabling signal SLMEN to the limiter-on voltage detecting circuit 92A.

In the pre-voltage detecting circuit 92B shown in FIG. 13, a voltage three times the threshold of the n-channel transistor is used as the detection voltage.

In this circuit structure, the operating current of the transistor determines the current consumed by the entire circuit. Therefore, voltage detection can be performed at a very small consumed current (approximately 10 [nA]).

Since the thresholds of the transistors are different due to various causes, highly accurate voltage detection is difficult.

In contrast, the limiter-on voltage detecting circuit 92A is formed by the circuit structure in which highly accurate voltage detection can be performed even though the consumed current is large.

Specifically, as shown in FIG. 13, the limiter-on voltage detecting circuit 92A includes a NAND circuit NA in which a sampling signal SSP corresponding to a limiter-on voltage detecting timing is input to one input terminal and the limiter enabling signal SLMEN is input to the other terminal, and when the limiter enabling signal SLMEN is at the "H" level and the sampling signal SSP is at the "H" level, an "L" level operation control signal is output; p-channel transistors TP11 and TP12 which enter an on-state when the "L" level operation control signal is output; and a voltage comparator CMP, to which operating power is supplied when the p-channel transistor TP12 is in the on-state, for sequentially comparing the reference voltage VREF with a generated voltage, or with a voltage obtained by exclusively turning on switches SWa, SWb, and SWc and by resistor-dividing a detected voltage, i.e., an accumulated voltage.

The NAND circuit NA outputs the "L" level operation control signal to the p-channel transistor TP11 and the p-channel transistor TP12 when the limiter enabling signal SLMEN is at the "H" level and the sampling signal SSP is at the "H" level.

Accordingly, both the p-channel transistors TP11 and TP12 enter the on-state.

As a result, the voltage comparator CMP is supplied with the operating power, and sequentially compares the reference voltage VREF with the generated voltage or with the voltage obtained by exclusively turning on the switches SWa, SWb, and SWc and by resistor-dividing the detected voltage, that is, the accumulated voltage. The detection result is output to the limiter circuit LM or the step-up/down circuit 49.

[1.2.5.2] Limiter Circuit

Figure 14:
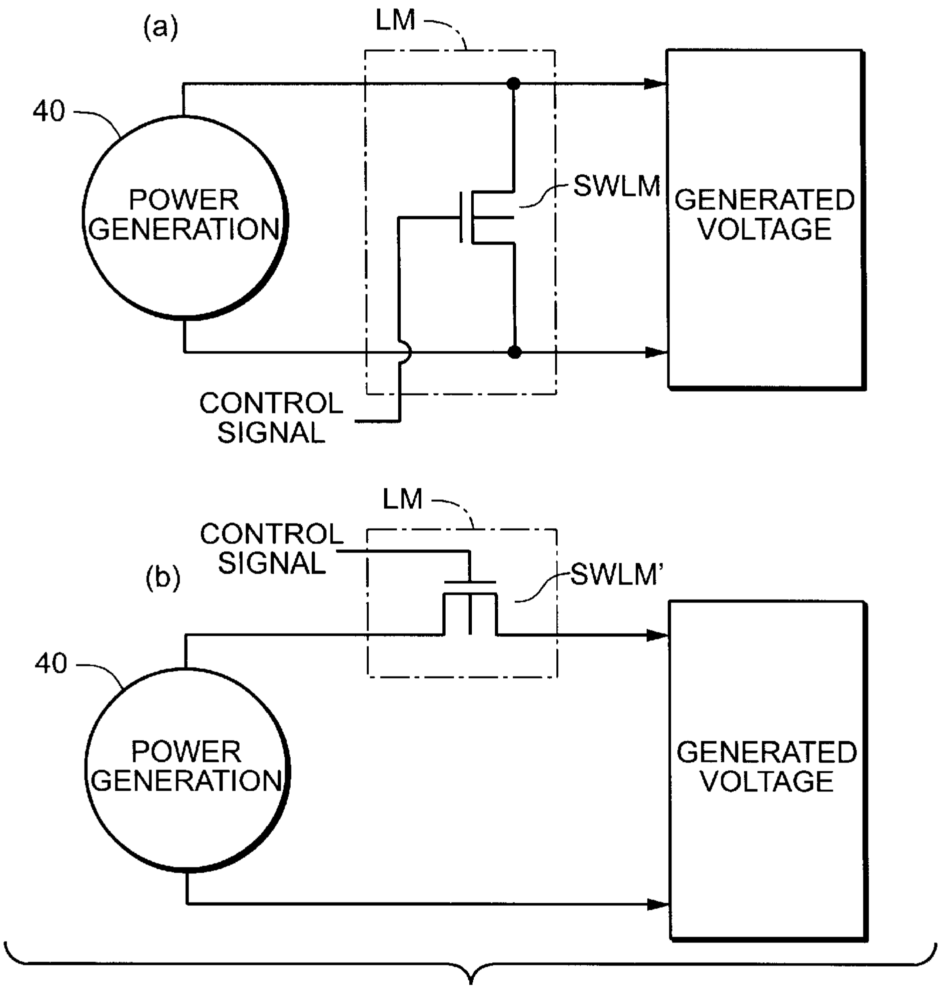
FIG. 14 includes diagrams of the detailed structure of a limiter circuit.

In FIG. 14, an example of the limiter circuit LM is shown.

FIG. 14(*a*) shows an example of the structure in which the output of the power generator 40 is shorted by a switching transistor SWLM so that the generated voltage is not output.

FIG. 14(*b*) shows an example of the structure in which the power generator 40 is opened by a switching transistor SWLM' so that the generated voltage is not output.

The power supply B of the present embodiment is provided with the step-up/down circuit 49. Even when the charging voltage VC is relatively low, the carrying mechanisms CS and CHM can be driven by boosting the power supply voltage using the step-up/down circuit 49.

In contrast, when the charging voltage VC is relatively high, which is higher than the driving voltage of the carrying mechanisms CS and CHM, the carrying mechanisms CS and CHM can be driven by decreasing the power supply voltage using the step-up/down circuit 49.

The central control circuit 93 determines the step-up/down multiplying factor based on the charging voltage VC and controls the step-up/down circuit 49.

When the charging voltage is extremely low, a power supply voltage sufficient for activating the carrying mechanisms CS and CHM cannot be obtained even when it is boosted. In such a case, when the mode is switched from the power-saving mode to the indicating mode, accurate time is not displayed, and power is wastefully consumed.

According to the present embodiment, the charging voltage VC is compared with a preset voltage value Vc, thus determining whether the charging voltage VC is sufficient. This is used as one condition for the transition from the power-saving mode to the indicating mode.

The central control circuit 93 includes a power-saving mode counter 101 for monitoring whether a designation to forcedly shift to the preset power-saving mode is made within a predetermined period of time when the user operates the external input unit 100; a seconds-hand position counter 102 for continuously and cyclically counting in which the seconds-hand position when the count value is zero corresponds to a predetermined power-saving mode indicating position (for example, at the position of one o'clock); an oscillation stop detecting circuit 103 for detecting whether oscillation in the pulse synthesis circuit 22 is stopped and for outputting an oscillation stop detection signal SOSC; the clock generating circuit 104 for generating the clock signal CK based on the output from the pulse synthesis circuit 22 and for outputting the clock signal CK; and the limiter/step-up/down control circuit 105 for turning on/off the limiter circuit LM and controlling the step-up/down multiplying factor of the step-up/down circuit 49 based on the limiter-on signal SLMON, the power supply voltage detection signal SPW, the clock signal CK, and the power generation state detection signal SPDET.

The mode as set by the above operation is stored in the mode storage unit 94, and the information is sent to the drive control circuit 24, the time information storage unit 96, and the preset value switching unit 95. In the drive control circuit 24, when the mode is switched from the indicating mode to the power-saving mode, the supply of a pulse signal to the seconds-hand driver 30S and the hour/minute-hand driver 30HM is stopped, thus deactivating the seconds-hand driver 30S and the hour/minute-hand driver 30HM. Accordingly, the motor 10 stops rotating, and the time indication is stopped.

Next, the time information storage unit 96 is formed by, specifically, an up-down counter (not shown). When the mode is switched from the indicating mode to the power-saving mode, the time information storage unit 96 starts measuring time in response to a reference signal generated by the pulse synthesis circuit 22, increasing the count value (up count). Hence, the duration of the power-saving mode is measured as the count value.

When the mode is switched from the power-saving mode to the indicating mode, the count value of the up-down counter is decreased (down count). When the count value is being decreased, the drive control circuit 24 outputs fast-forward pulses to the seconds-hand driver 30S and the hour/minute-hand driver 30HM.

When the count value of the up-down counter is zero, that is, when the duration of the power-saving mode and a fast-forward carriage time corresponding to a duration of the fast-forward carriage elapse, a control signal for stopping the sending of the fast-forward pulses is generated. The control signal is sent to the seconds-hand driver 30S and the hour/minute-hand driver 30HM.

As a result, the indicated time is restored to the present time.

Accordingly, the time information storage unit 96 is also capable of restoring the re-indicated time to the present time.

Next, the drive control circuit 24 generates drive pulses in accordance with the mode based on various pulses output from the pulse synthesis circuit 22. In the power-saving mode, the supply of the drive pulses is stopped. Immediately after the switching from the power-saving mode to the indicating mode, the fast-forward pulses with a short pulse interval are supplied as the drive pulses to the seconds-hand driver 30S and the hour/minute-hand driver 30HM in order to restore the re-indicated time to the present time.

When the supply of the fast-forward pulses is completed, the drive pulses with a normal pulse interval are sent to the seconds-hand driver 30S and the hour/minute-hand driver 30HM.

[1.2.5.3] Limiter/step-up/down Control Circuit

Figure 16:
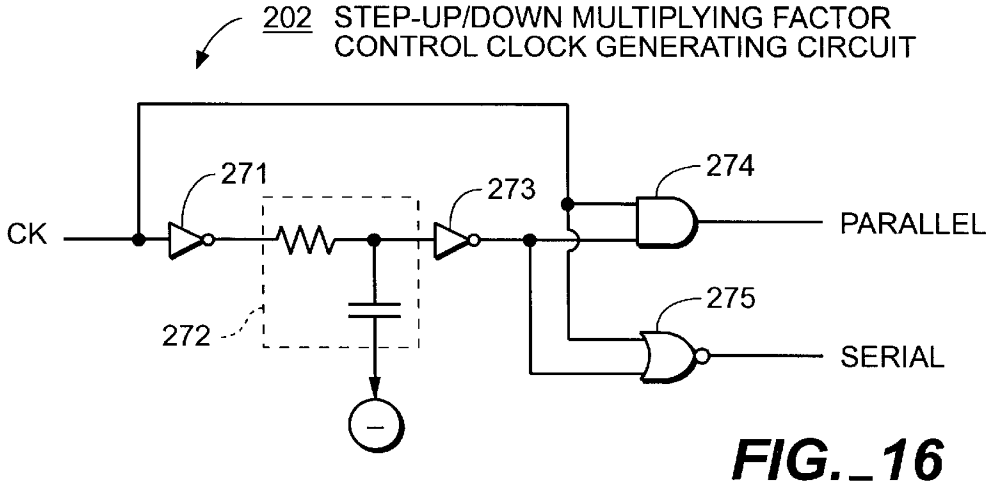
FIG. 16 is a block diagram of the detailed structure of a step-up/down multiplying factor control clock generating circuit.
Figure 15:
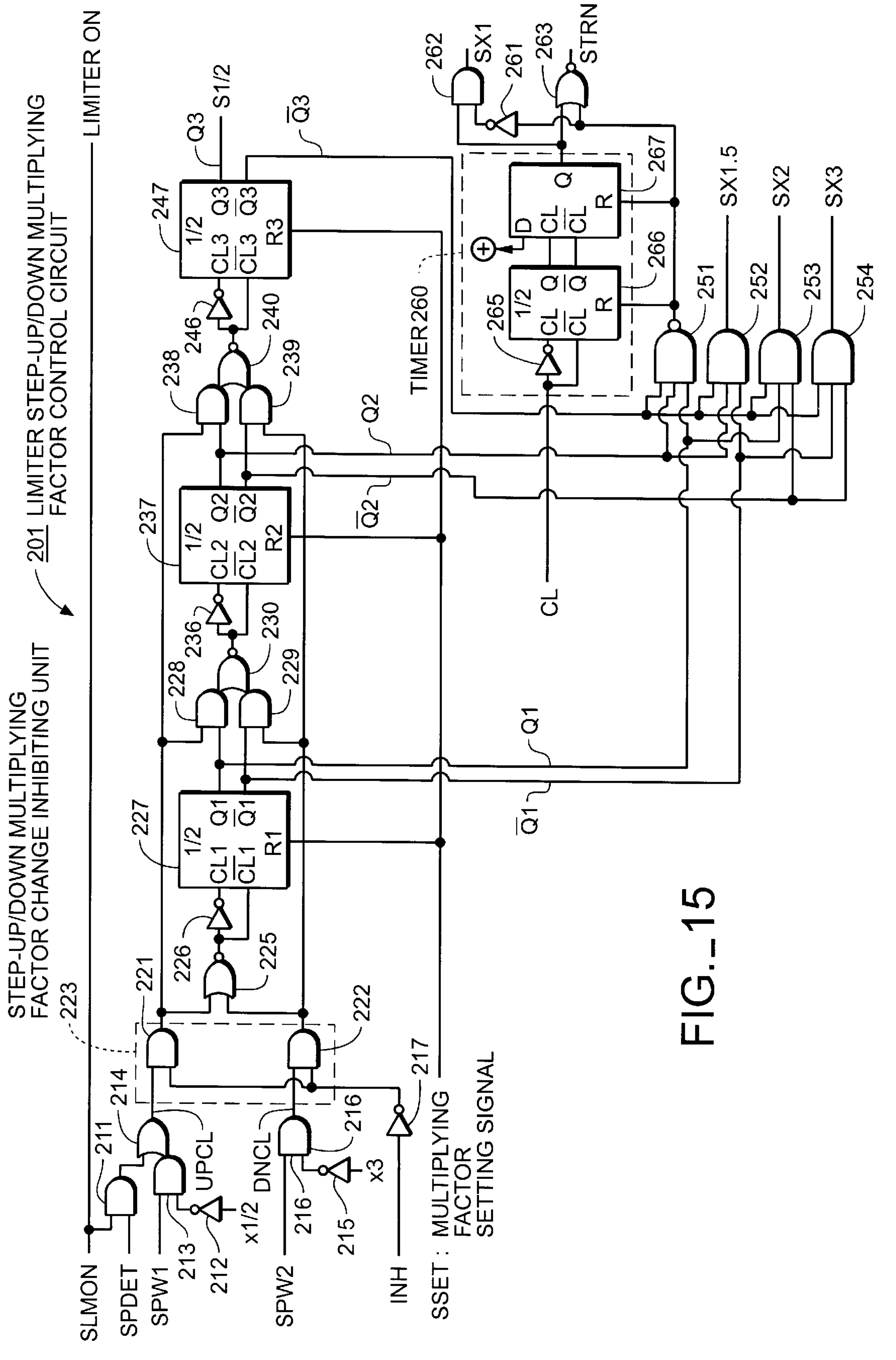
FIG. 15 is a block diagram of the detailed structure of a limiter/step-up/down multiplying factor control circuit.
Figure 17:
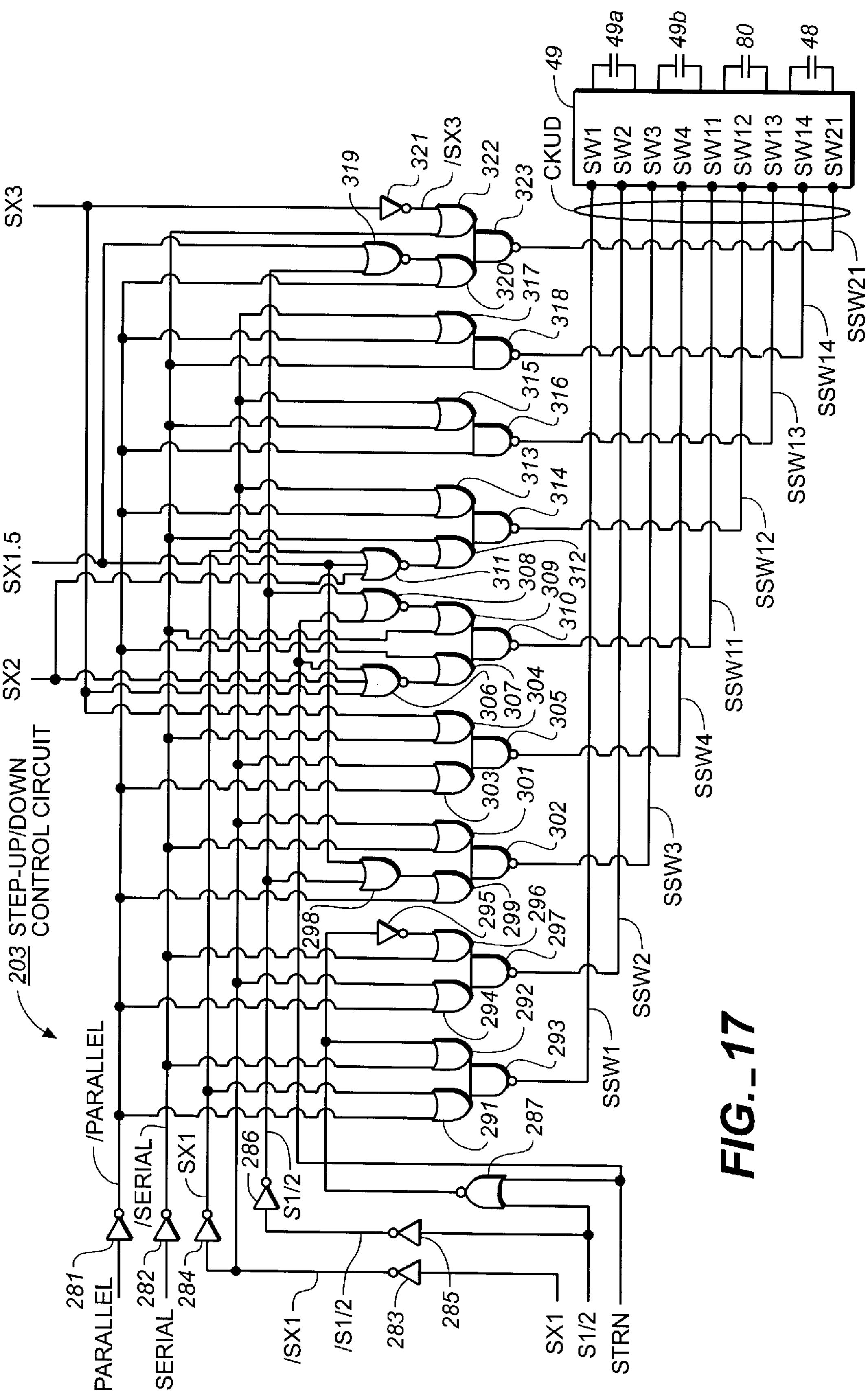
FIG. 17 is a block diagram of the detailed structure of a step-up/down control circuit.

The structure of the limiter/step-up/down control circuit 105 is described in detail with the reference to FIGS. 15 to 17.

The limiter/step-up/down control circuit 105 is roughly divided into a limiter/step-up/down multiplying factor control circuit 201 shown in FIG. 15, a step-up/down multiplying factor control clock generating circuit 202 shown in FIG. 16, and a step-up/down control circuit 203 shown in FIG. 17.

[1.2.5.3.1] Limiter/step-up/down Multiplying Factor Control Circuit

As shown in FIG. 15, the limiter/step-up/down multiplying factor control circuit 201 includes an AND circuit 211 in which the limiter-on signal SLMON, which becomes the "H" level when the limiter circuit LM is activated, is input to one input terminal, and the power generation state detection signal SPDET, which is output when the power generator 40 is in the power generation state, is input to the other input terminal; an inverter 212, in which a ×½ signal S1/2, which becomes the "H" level when the voltage is stepped down by ½, is input to an input terminal for inverting the ×½ signal S1/2 to be output as an inverted ×½ signal /S1/2; an AND circuit 213 in which one input terminal is connected to an output terminal of the inverter 212, and a signal SPW1 is input to the other input terminal; an OR circuit 214, in which one input terminal is connected to an output terminal of the AND circuit 211 and the other input terminal is connected to an output terminal of the AND circuit 213, which outputs an up-clock signal UPCL for increasing the count value for setting the step-up/down multiplying factor; an inverter 215, in which a ×3 signal SX3, which becomes the "H" level when the voltage is ×3 boosted, is input to an input terminal for inverting the ×3 signal SX3 to be output as an inverted ×3 signal /SX3; an AND circuit 216, in which one input terminal is connected to an output terminal of the inverter 215 and a signal SPW2 is input to the other input terminal, for outputting a down-clock signal DNCL for decreasing the count value for setting the step-up/down multiplying factor; and an inverter 217, in which a step-up/down multiplying factor change inhibiting signal INH, which becomes the "H" level when changing of the step-up/down multiplying factor is inhibited, is input to an input terminal for inverting the step-up/down multiplying factor change inhibiting signal INH to be output as an inverted step-up/down multiplying factor change inhibiting signal /INH.

The limiter/step-up/down multiplying factor control circuit 201 further includes an AND circuit 221 in which the up-clock signal is input to one input terminal and the inverted step-up/down multiplying factor change inhibiting signal /INH is input to the other input terminal, thus nullifying the up-clock signal UPCL when the inverted step-up/down multiplying factor change inhibiting signal /INH is at the "L" level, that is, when changing of the step-up/down multiplying factor is inhibited; and an AND circuit 222 in which the down-clock signal DNCL is input to one input terminal and the inverted step-up/down multiplying factor change inhibiting signal /INH is input to the other input terminal, thus nullifying the down-clock signal DNCL when the inverted step-up/down multiplying factor change inhibiting signal /INH is at the "L" level, that is, when changing of the step-up/down multiplying factor is inhibited. The AND circuit 221 and the AND circuit 222 function as a step-up/down multiplying factor change inhibiting unit 223.

The limiter/step-up/down multiplying factor control circuit 201 has a NOR circuit 225 in which one input terminal is connected to an output terminal of the AND circuit 221 and the other input terminal is connected to an output terminal of the AND circuit 222; an inverter 226 for inverting and outputting an output signal from the NOR circuit 225; a first counter 227 in which an output signal of the inverter 226 is input to a clock terminal CL1, the output signal from the NOR circuit 225 is input to an inverted clock terminal /CL1, and a multiplying factor setting signal SSET is input to a reset terminal R1, thus outputting first count data Q1 and inverted first count data /Q1; an AND circuit 228 in which one input terminal is connected to the output terminal of the AND circuit 221, and the first count data Q1 is input to the other input terminal; an AND circuit 229 in which one input terminal is connected to the output terminal of the AND circuit 222, and the inverted first count data /Q1 is input to the other input terminal; and a NOR circuit 230 in which one input terminal is connected to an output terminal of the AND circuit 228, and the other input terminal is connected to an output terminal 229 of the input terminal.

The limiter/step-up/down multiplying factor control circuit 201 further includes an inverter 236 for inverting and outputting an output signal from the NOR circuit 230; a second counter 237 in which an output signal from the inverter 236 is input to a clock terminal CL2, an output signal from the NOR circuit 230 is input to an inverted clock terminal /CL2, and the multiplying factor setting signal SSET is input to a reset terminal R2, thus outputting second count data Q2 and inverted second count data /Q2; an AND circuit 238 in which one input terminal is connected to the output terminal of the AND circuit 221, and the second count data Q2 is input to the other input terminal; an AND circuit 239 in which one input terminal is connected to the output terminal of the AND circuit 222, and the inverted count data /Q2 is input to the other input terminal; and a NOR circuit 240 in which one input terminal is connected to an output terminal of the AND circuit 238, and the other input terminal is connected to an output terminal of the AND circuit 239.

The limiter/step-up/down multiplying factor control circuit 201 further includes an inverter 246 for inverting and outputting an output signal from the NOR circuit 240; a third counter 247, in which an output signal from the inverter 246 is input to a clock terminal CL3, an output signal of the NOR circuit 240 is input to an inverted clock terminal /CL3, and the multiplying factor setting signal SSET is input to a reset terminal R3, thus outputting third count data Q3 (which serves as the ×½ signal S1/2) and inverted third count data /Q3; a NAND circuit 251 in which the inverted third count data /Q3 is input to a first input terminal, the second count data Q2 is input to a second input terminal, and the first count data Q1 is input to a third input terminal, thus outputting the logical NAND of these data; a AND circuit 252 in which the inverted third count data /Q3 is input to a first input terminal, the second count data Q2 is input to a second input terminal, and the inverted first count data /Q1 is input to a third input terminal, thus obtaining the logical AND of these data to be output as a ×1.5 signal SX1.5 which becomes the "H" level when the voltage is ×1.5 boosted; a AND circuit 253 in which the inverted third count data /Q3 is input to a first input terminal, the first count data Q1 is input to a second input terminal, and the inverted second count data /Q2 is input to a third input terminal, thus obtaining the logical AND of these data to be output as a ×2 signal SX2 which becomes the "H" level when the voltage is ×2 boosted; and a AND circuit 254 in which the inverted third count data /Q3 is input to a first input terminal, the inverted first count data /Q1 is input to a second input terminal, and the inverted second count data /Q2 is input a third input terminal, thus obtaining the logical AND of these data to be output as the ×3 signal SX3 which becomes the "H" level when the voltage is ×3 boosted.

The limiter/step-up/down multiplying factor control circuit 201 further includes a timer 260 for outputting a transition period signal for causing a charge transfer mode signal STRN to become the "H" level in a period of one to two periods (undefined within this range) of the clock signal CK when the step-up/down multiplying factor is shifted from ×1.5 boosting to ×1 boosting (that is, no boosting) or when the step-up/down multiplying factor is shifted from stepping down by ½ to ×1 boosting; an inverter 261 for inverting and outputting an output signal from the NAND circuit 251; an AND circuit 262 in which the transition period signal is input to one input terminal, and an output signal from the inverter 261 is input to the other input terminal, thus obtaining the logical AND of these signals to be output as a ×1 signal SX1 which becomes the "H" level when the voltage is ×1 boosted (no boosting); and a NOR circuit 263 in which the transition period signal is input to one input terminal, and the output signal of the NAND circuit 251 is input to the other input terminal, thus obtaining the logical NOR of these signals to be output as the charge transfer mode signal STRN which becomes the "H" level in the charge transfer mode.

The timer 260 includes an inverter 265 for inverting the clock signal CK to be output as an inverted clock signal /CK; a first counter 266 in which the inverted clock signal /CK is input to a clock terminal CL, the clock signal CK is input to an inverted clock terminal /CL1, and the output signal from the NAND circuit 251 is input to a reset terminal R; and a second counter 267 in which a clock terminal CL is connected to an output terminal Q of the first counter 266, an inverted clock terminal /CL is connected to an output terminal /Q of the first counter 266, the output signal of the NAND circuit 251 is input to a reset terminal R, and an output terminal Q outputs the transition period signal.

Figures 18, 19, 21:
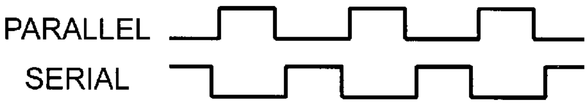
FIG. 18 is an illustration of the operation of the limiter/step-up/down multiplying factor control circuit.
FIG. 19 is an illustration of waveforms of a parallel signal and a serial signal.
FIG. 21 is an illustration of the operation of the reference clock signal output circuit.

In FIG. 18, an illustration of the operation of the limiter/step-up/down multiplying factor control circuit is shown.

In the above structure, the relationship among the first count data Q1, the second count data Q2, and the third count data Q3 is as shown in FIG. 18. For example, when the following equations are true, the step-up/down multiplying factor is ×3, and the ×3 signal Sx3 is at the "H" level:

Q1=0 (="L"), Q2=0 (="L"), Q3=0 (="L")

When the following equations are true, the step-up/down multiplying factor is ×1.5, and the ×1.5 signal Sx1.5 is at the "H" level:

Q1=0 (="L"), Q2=1 (="H"), Q3=0 (="L")

When the following equation is true, the step-up multiplying factor is ×½, and the ×½ signal S1/2 is at the "H" level:

Q3=1 ("H")

[1.2.5.3.2] Step-up/down Multiplying Factor Control Clock Generating Circuit

As shown in FIG. 16, the step-up/down multiplying factor control clock generating circuit 202 includes an inverter 271 for inverting the clock signal CK; a low-pass filter 272 for removing a high-pass component of an output from the inverter 271 and outputting the signal; an inverter 273 for inverting and outputting an output signal from the low-pass filter 272; an AND circuit 274 in which the clock signal CK is input to one input terminal, and an output signal from the inverter 273 is input to the other terminal, thus obtaining the logical AND of the two input signals to be output as a parallel signal Parallel; and a NOR circuit 275 in which the clock signal CK is input to one input terminal, and the output signal from the inverter 273 is input to the other input terminal, thus obtaining the logical NOR of the two signals to be output as a serial signal Serial.

In FIG. 19, illustrations of waveforms of the parallel signal and the serial signal are shown.

In the above structure, the waveforms of the parallel signal Parallel and the serial signal Serial are, for example, as shown in FIG. 19.

[1.2.5.3.3] Step-up/down Control Circuit

As shown in FIG. 17, the step-up/down control circuit 203 includes an inverter 281 for inverting the parallel signal Parallel to be output as an inverted parallel signal /Parallel; an inverter 282 for inverting the serial signal Serial to be output as an inverted serial signal /Serial; an inverter 283 for inverting the ×1 signal SX1 to be output as an inverted ×1 signal /SX1; an inverter 284 for inverting again the inverted ×1 signal /SX1 to be output as the ×1 signal SX1; an inverter 285 for inverting the ×½ signal S1/2 to be output as an inverted ×½ signal /S1/2; an inverter 286 for inverting again the inverted ×½ signal /S1/2 to be output as the ×½ signal S1/2; and a NOR circuit 287 in which the ×½ signal S1/2 is input to one terminal, and the transfer mode signal STRN is input to the other input terminal, thus obtaining the logical NOR of the ×½ signal S1/2 and the transfer mode signal STRN.

The step-up/down control circuit 203 further includes a first OR circuit 291 in which the inverted parallel signal /Parallel is input to one input terminal, and the ×1 signal SX1 is input to the other input terminal; a second OR circuit 292 in which the inverted serial signal /Serial is input to one input terminal, and an output signal from the NOR circuit 287 is input to the other input terminal; a NAND circuit 293 in which one input terminal is connected to an output terminal of the first OR circuit 291, and the other input terminal is connected to an output terminal of the second OR circuit 292, thus obtaining the logical NAND of outputs from the two OR circuits and outputting a switch control signal SSW1 so as to control the switch SW1, which becomes the "H" level when the switch SW1 is turned on; a third OR circuit 294 in which the inverted parallel signal /Parallel is input to one input terminal, and the inverted ×1 signal /SX1 is input to the other input terminal; an inverter 295 for inverting and outputting an output signal from the NOR circuit 287; a fourth OR circuit 296 in which the inverted serial signal /Serial is input to one input terminal, and an output signal from the inverter 295 is input to the other input terminal; and a NAND circuit 297 in which one input terminal is connected to an output terminal of the third OR circuit 294, and the other input terminal is connected to an output terminal of the fourth OR circuit 296, thus obtaining the logical NAND of outputs of the two OR circuits and outputting a switch control signal SSW2 so as to control the switch SW2, which becomes the "H" level when the switch 2 is turned on.

The step-up/down control circuit 203 further includes an OR circuit 298 in which the ×½ signal S1/2 is input to one input terminal, and the ×1.5 signal SX1.5 is input to the other input terminal, thus obtaining and outputting the logical OR of the two signals; a fifth OR circuit 299 in which the inverted parallel signal /Parallel is input to one input terminal, and an output signal from the OR circuit 298 is input to the other input terminal; a sixth OR circuit 301 in which the inverted serial signal /Serial is input to one input terminal, and the inverted ×1 signal /SX1 is input to the other input terminal; a NAND circuit 302 in which one input terminal is connected to an output terminal of the fifth OR circuit 299, and the other input terminal is connected to an output terminal of the sixth OR circuit 301, thus obtaining the logical NAND of outputs of the two OR circuits and outputting a switch control signal SSW3 so as to control the switch SW3, which becomes the "H" level when the switch SW3 is turned on; a seventh OR circuit 303 in which the inverted parallel signal /Parallel is input to one input terminal, and the inverted ×1 signal /SX1 is input to the other input terminal; an eighth OR circuit 304 in which the inverted serial signal /Serial is input to one input terminal, and the ×3 signal SX3 is input to the other input terminal; and a NAND circuit 305 in which one input terminal is connected to an output terminal of the seventh OR circuit 303, and the other input terminal is connected to an output terminal of the eighth OR circuit 304, thus obtaining the logical NAND of outputs of the two OR circuits and outputting a switch control signal SSW4 so as to control the switch SW4, which becomes the "H" level when the switch SW4 is turned on.

The step-up/down control circuit 203 further includes a NOR circuit 306 in which the ×3 signal SX3 is input to a first input terminal, the ×2 signal SX2 is input to a second input terminal, and the transfer mode signal STRN is input to a third input terminal, thus obtaining and outputting the logical NOR of these input signals; a ninth OR circuit 307 in which an output signal from the NOR circuit 306 is input to one input terminal, and the inverted parallel signal /Parallel is input to the other input terminal; a NOR circuit 308 in which the transfer mode signal STRN is input to one input terminal, and the ×½ signal S1/2 is input to the other input terminal; a tenth OR circuit 309 in which the inverted serial signal /Serial is input to one input terminal, and the other input terminal is connected to an output terminal of the NOR circuit 308; a NAND circuit 310 in which one input terminal is connected to an output terminal of the ninth OR circuit 307, and the other input terminal is connected to an output terminal of the tenth OR circuit 309, thus obtaining the logical NAND of outputs of the two OR circuits and outputting a switch control signal SSW11 so as to control the switch SW11, which becomes the "H" level when the switch SW11 is turned on; a NOR circuit 311 in which the ×2 signal SX2 is input to a first input terminal, the ×1.5 signal SX1.5 is input to a second input terminal, and the ×1 signal SX1 is input to a third input terminal, thus obtaining and outputting the logical NOR of these input signals; an eleventh OR circuit 312 in which an output signal from the NOR circuit 311 is input to one input terminal, and the inverted serial signal /Serial is input to the other input terminal; a twelfth OR circuit 313 in which the inverted parallel signal /Parallel is input to one input terminal, and the inverted ×1 signal /SX1 is input to the other input terminal; and a NAND circuit 314 in which one input terminal is connected to an output terminal of the eleventh OR circuit 312, and the other input terminal is connected to an output terminal of the twelfth OR circuit 313, thus obtaining the logical NAND of outputs of the two OR circuits and outputting a switch control signal SSW12 so as to control the switch SW12, which becomes the "H" level when the switch SW12 is turned on.

The step-up/down control circuit 203 further includes a thirteenth OR circuit 315 in which the inverted serial signal /Serial is input to one input terminal, and the inverted ×1 signal /SX1 is input to the other input terminal; a NAND circuit 316 in which the inverted parallel signal /Parallel is input to one input terminal, and an output signal from the thirteenth OR circuit 315 is input to the other input terminal, thus obtaining the logical NAND of the inverted parallel signal /Parallel and the output signal from the thirteenth OR circuit 315 and outputting a switch control signal SSW13 so as to control the switch SW13, which becomes the "H" level when the switch SW13 is turned on; a fourteenth OR circuit 317 in which the inverted parallel signal /Parallel is input to one input terminal, and the inverted ×1 signal /SX1 is input to the other input terminal; and a NAND circuit 318 in which the inverted serial signal /Serial is input to one input terminal, and an output signal from the fourteenth OR circuit 317 is input to the other input terminal, thus obtaining the logical NAND of the inverted serial signal /Serial and the output signal from the fourteenth OR circuit 317 and outputting a switch control signal SSW14 so as to control the switch SW14, which becomes the "H" level when the switch SW14 is turned on.

The step-up/down control circuit 203 further includes a NOR circuit 319 in which the ×½ signal S1/2 is input to one input terminal, and the ×1.5 signal SX1.5 is input to the other input terminal; a fifteenth OR circuit 320 in which the inverted parallel signal /Parallel is input to one input terminal, and an output signal from the NOR circuit 319 is input to the other input terminal; an inverter 321 in which the ×3 signal SX3 is input to an input terminal, and the ×3 signal SX3 is inverted to be output as the inverted ×3 signal /SX3; a sixteenth OR circuit 322 in which the inverted serial signal /Serial is input to one input terminal, and the inverted ×3 signal /SX3 is input to the other input terminal, thus obtaining and outputting the logical OR of the inverted serial signal /Serial and the inverted ×3 signal /SX3; and a NAND circuit 323 in which one input terminal is connected to an output terminal of the fifteenth OR circuit 320, and the other input terminal is connected to an output terminal of the sixteenth OR circuit 322, thus obtaining the logical NAND of outputs of the two OR circuits and outputting a switch control signal SSW21 so as to control the switch SW21, which becomes the "H" level when the switch SW12 is turned on.

As a result, the step-up/down control circuit 203 outputs the switch control signals SSW1, SSW2, SSW3, SSW4, SSW11, SSW12, SSW13, SSW14, and SSW21, which correspond to the illustrations of the operation of the step-up/down circuit shown in FIG. 3, at timings based on the parallel signal Parallel and the serial signal /Serial.

[1.2.5.3.4] Reference Clock Signal Output Circuit

Figure 20:
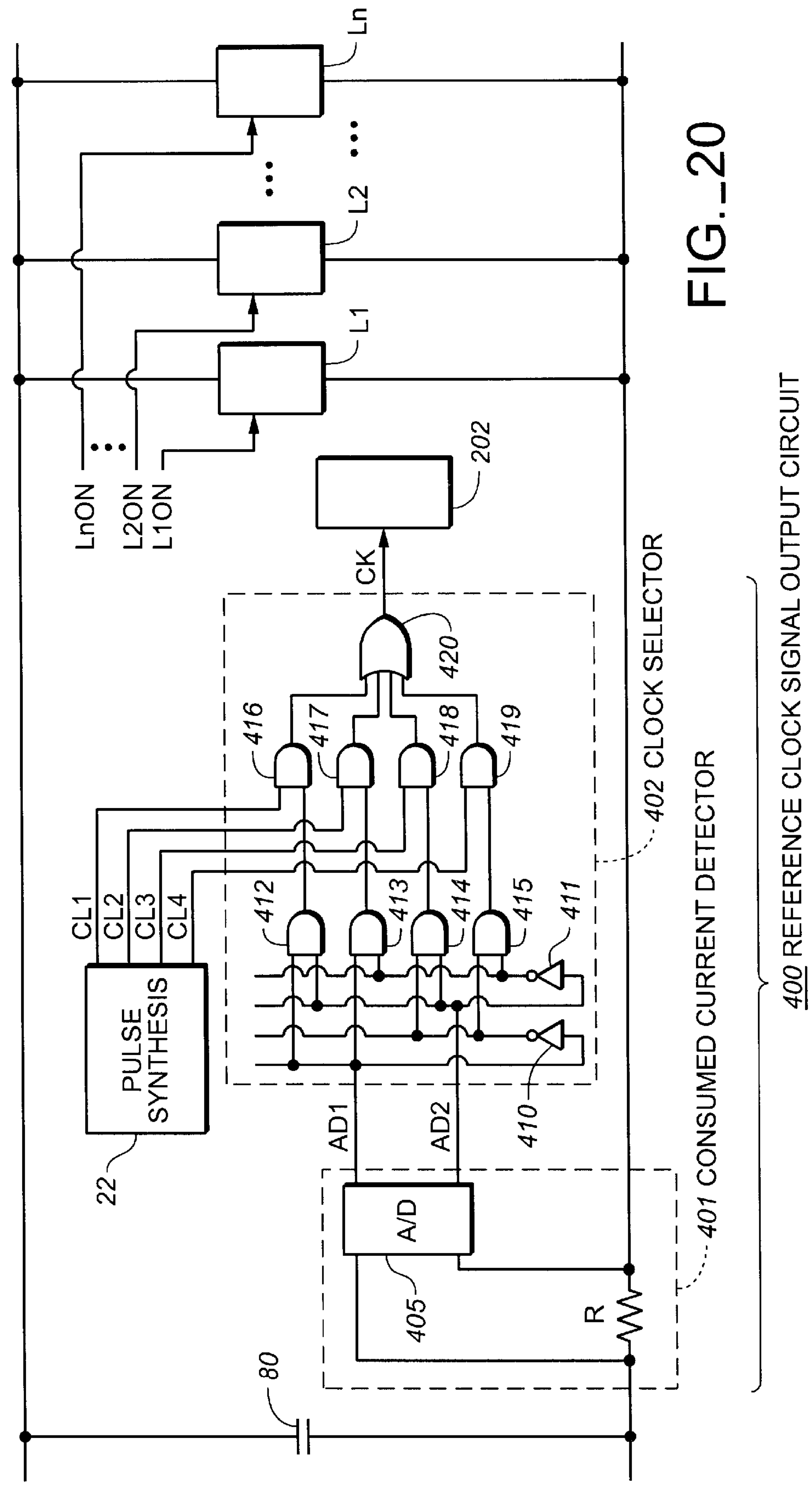
FIG. 20 is a block diagram of the detailed structure of a reference clock signal output circuit.

Referring to FIG. 20, a reference clock signal output circuit for outputting the clock signal CK, which is used when the parallel signal Parallel and the serial signal Serial are generated by the step-up/down multiplying factor control clock generating circuit 202, in accordance with consumed current (that is, the power consumption) of driven units L1 to Ln is described.

A reference clock signal output circuit 400 is roughly divided into a consumed current detector 401 for detecting the total power consumption of the driven units L1 to Ln as the total consumed current, and a clock selector 402 for selecting from clock signals CL1 to CL4 generated by the pulse synthesis circuit 22 based on the detection result from the consumed current detector 401 and outputting the selected signal as the clock signal CK, which is used as the basis for the step-up/down control clock, to the step-up/down multiplying factor control clock generating circuit 202.

In this case, the relationship among the frequencies of the clock signals CL1 to CL4 is as follows:

(high frequency) CL1>CL2>CL3>CL4 (low frequency)

Accordingly, the power supply ability is greatest when the clock signal CL1 is output as the clock signal CK, which is suitable for high power consumption. The power supply ability is smallest when the clock signal CL4 is output as the clock signal CK, which is suitable for low power consumption.

In FIG. 20, the driven units L1 to Ln are switched between a driving state and a non-driving state by state control signals L1ON to LnON.

The consumed current detector 401 includes a resistor R with a low resistance inserted in a power line, and an A/D converter 405 for converting power consumption of the driven units L1 to Ln, including the motor drive circuit, into a voltage generated at the resistor R, and then converting the voltage into 2-bit data expressed by 1-bit digital data AD1 and AD2.

The clock selector 402 includes a first inverter 410, to which the digital data AD1 is input, for outputting inverted digital data /AD1; a second inverter 411, to which the digital data AD2 is input, for outputting inverted digital data /AD2; a first AND circuit 412 in which the digital data AD1 is input to one input terminal, and the digital data AD2 is input to the other input terminal, thus outputting a first clock selection signal; a second AND circuit 413 in which the digital data AD1 is input to one input terminal, and the inverted digital data /AD2 is input to the other input terminal, thus outputting a second clock selection signal; a third AND circuit 414 in which the inverted digital data /AD1 is input to one input terminal, and the digital data AD2 is input to the other input terminal, thus outputting a third clock selection signal; a fourth AND circuit 415 in which the inverted digital data /AD1 is input to one input terminal, and the inverted digital data /AD2 is input to the other input terminal, thus outputting a fourth clock selection signal; a fifth AND circuit 416 in which the clock signal CL1 generated by the pulse synthesis circuit 22 is input to one input terminal, and the first clock selection signal is input to the other input terminal, thus outputting the clock signal CL1 as the clock signal CK when the first clock signal is at the "H" level; a sixth AND circuit 417 in which the clock signal CL2 generated by the pulse synthesis circuit 22 is input to one input terminal, and the second clock selection signal is input to the other input terminal, thus outputting the clock signal CL2 as the clock signal CK when the second clock selection signal is at the "H" level; a seventh AND circuit 418 in which the clock signal CL3 generated by the pulse synthesis circuit 22 is input to one input terminal, and the third clock selection signal is input to the other input terminal, thus outputting the clock signal CL3 as the clock signal CK when the third clock selection signal is at the "H" level; an eighth AND circuit 419 in which the clock signal CL4 generated by the pulse synthesis circuit 22 is input to one input terminal, and the fourth clock selection signal is input to the other input terminal, thus outputting the clock signal CL4 as the clock signal CK when the fourth clock selection signal is at the "H" level; and an OR circuit 420 for obtaining the logical OR of outputs of the fifth AND circuit to the eighth AND circuit and outputting one of the clock signals CL1 to CL4 as the clock signal CK.

Referring to FIG. 20, the operation of the reference clock output circuit is described.

The A/D converter 405 of the consumed current detector 401 converts the power consumed by the driven units L1 to Ln, including the motor drive circuit, into the voltage generated at the resistor R. Then the A/D converter 405 converts the voltage into 2-bit data expressed by the 1-bit digital data AD1 and AD2, and outputs the data to the clock selector 402.

More specifically, as shown in FIG. 21, the A/D converter 405 divides the voltage generated across the resistor R into four stages. At a first stage in which the voltage across the resistor R is smallest, the following can be concluded:

AD1=0,AD2=0

Similarly, the following can be concluded:
Second stage: AD1=0, AD2=1
Third stage: AD1=1, AD2=0

At a fourth stage in which the voltage across the resistor R is largest, the following can be concluded:

AD1=1, AD2=1

In this case, it can be understood that the power consumed by the driven units L1 to Ln increases in accordance with the sequence from the first stage to the fourth stage of the voltage across the resistor R.

In contrast, the digital data AD1 is input to the first inverter 410 of the clock selector 402, and the first inverter 410 outputs the inverted digital data /AD1 to the third AND circuit 414 and the fourth AND circuit 415. The digital data AD2 is input to the second inverter 411, and the second inverter 411 outputs the inverted digital data /AD2 to the second AND circuit 413 and the fourth AND circuit 415.

As a result, when the voltage across the resistor R is at the first stage, that is, when the power consumed by the driven units L1 to Ln is smallest, only the output of the fourth AND circuit 415 is at the "H" level, whereas the outputs of the remaining first to third AND circuits 412 to 414 are at the "L" level.

Accordingly, among the fifth to eighth AND circuits 416 to 419, only the eighth AND circuit 419 outputs the clock signal CL4 to the OR circuit 420, whereas the outputs of the fifth to seventh AND circuits 416–418 are at the "L" level at all times. The OR circuit 420 outputs the clock signal CL4 as the clock signal CK.

When the voltage across the resistor R is at the second stage, only the output of the third AND circuit 414 is at the "H" level, whereas the outputs of the remaining first, second, and fourth AND circuits 412, 414, and 415 are at the "L" level.

Accordingly, the seventh AND circuit 414 outputs the clock signal CL3 to the OR circuit 420. The outputs of the fifth, sixth, and eighth AND circuits 416, 417, and 419 are at the "L" level at all times. The OR circuit 420 outputs the clock signal CL3 as the clock signal CK.

When the voltage across the resistor R is at the third stage, only the output of the second AND circuit 413 is at the "H" level, whereas the outputs of the remaining first, third, and fourth AND circuits 412, 414, and 415 are at the "L" level.

Accordingly, the sixth AND circuit 417 outputs the clock signal CL2 to the OR circuit 420. The outputs of the fifth, seventh, and eighth AND circuits 416, 418, and 419 are at the "L" level at all times. The OR circuit 420 outputs the clock signal CL2 as the clock signal CK.

When the voltage across the resistor R is at the fourth stage, that is, when the power consumed by the driven units L1 to Ln is largest, only the output of the first AND circuit 412 is at the "H" level, whereas the outputs of the remaining second to fourth AND circuits 413 to 415 are at the "L" level.

Accordingly, the fifth AND circuit 416 outputs the clock signal CL3 to the OR circuit 420. The outputs of the sixth to eighth AND circuits 417 to 419 are at the "L" level at all times. The OR circuit 420 outputs the clock signal CL1 as the clock signal CK.

As a result, the larger the voltage across the resistor R, that is, the larger the power consumption, the higher the frequency of the selected clock signal will be. Hence, the number of charge transfers per unit time is increased, thus making the driving of a load that consumes large power possible.

[1.3] Operation of the First Embodiment

[1.3.1]

[1.3.2] Operation of the First Embodiment

Figure 22:
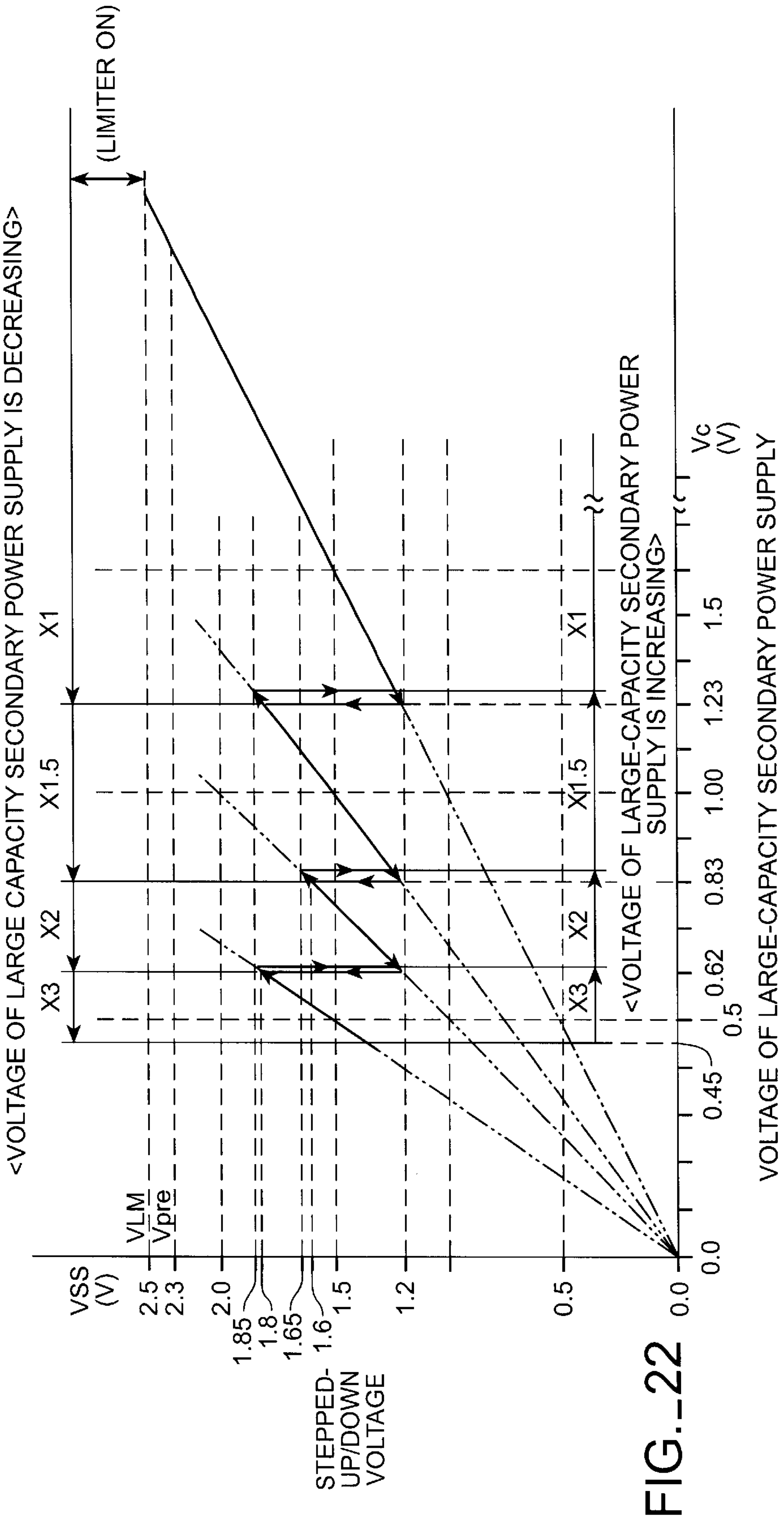
FIG. 22 is an illustration of the operation of the first embodiment.

The operation of the first embodiment is described with reference to FIG. 22.

In the initial stage, it is assumed that the power generation state detecting circuit 91 is in an operating state, the limiter circuit LM is in a non-operating state, the step-up/down circuit 49 is in a non-driving state, the limiter-on voltage detecting circuit 92A is in a non-operating state, the pre-voltage detecting circuit 92B is in a non-operating state, and the power supply voltage detecting circuit 92C is in an operating state.

In the initial state, the voltage of the large-capacity secondary power supply 48 is below 0.45 [V].

The minimum voltage for driving the carrying mechanisms CS and CHM is set below 1.2 [V].

[1.3.2.1] When Voltage of Large-capacity Secondary Power Supply Increases [1.3.2.1.1] 0.0 to 0.62 [V]

When the voltage of the large-capacity secondary power supply 98 is below 0.45 [V], the step-up/down circuit 49 is in the non-operating state. The power supply voltage detected by the power supply voltage detecting circuit 92C is below 0.45 [V]. Therefore, the carrying mechanisms CS and CHM remain in a non-driving state.

Subsequently, when the power generation state detecting circuit 91 detects the power generation by the power generator 40, the pre-voltage detecting circuit 92B enters an operating state.

When the voltage of the large-capacity secondary power supply exceeds 0.45 [V], the limiter/step-up/down control circuit 105 controls the step-up/down circuit 49 based on the power supply voltage detection signal SPW from the power supply voltage detecting circuit 92C, thus making the step-up/down circuit 49 perform ×3 boosting.

Accordingly, the step-up/down circuit 49 performs ×3 boosting. This ×3 boosting is continued by the limiter/step-up/down control circuit 105 until the voltage of the large-capacity secondary power supply reaches 0.62 [V].

As a result, the charging voltage of the auxiliary capacitor 80 becomes equal to or greater than 1.35 [V], thus activating the carrying mechanisms CS and CHM.

In this case, there is a possibility that the voltage suddenly increases and exceeds the absolute rated voltage depending on power generation states, such as when the timepiece is suddenly shaken. When the step-up/down multiplying factor is controlled in accordance with the power generation state, so that the step-up/down multiplying factor is shifted to ×2 or ×1.5 boosting instead of ×3 boosting, the supply of the operating voltage is more stabilized. The same thing can be said in the following cases.

[1.3.2.1.2] 0.62 [V] To 0.83 [V]

When the voltage of the large-capacity secondary power supply 48 exceeds 0.62 [V], the limiter/step-up/down control circuit 105 controls the step-up/down circuit 49 based on the power supply voltage detection signal SPW from the power supply voltage detecting circuit 92C, thus making the step-up/down circuit 49 perform ×2 boosting.

Accordingly, the step-up/down circuit 49 performs ×2 boosting. This ×2 boosting is continued by the limiter/step-up/down control circuit 105 until the voltage of the large-capacity secondary power supply 48 reaches 0.83 [V].

As a result, the charging voltage of the auxiliary capacitor 80 becomes equal to or greater than 1.24 [V]. Hence, the carrying mechanisms CS and CHM remain in the driving state.

[1.3.2.1.3] 0.83 [V] To 1.23 [V]

When the voltage of the large-capacity secondary power supply 48 exceeds 0.83 [V], the limiter/step-up/down control circuit 105 controls the step-up/down circuit 49 based on the power supply voltage detection signal SPW from the power supply voltage detecting circuit 92C, thus making the step-up/down circuit 49 perform ×1.5 boosting.

Accordingly, the step-up/down circuit 49 performs ×1.5 boosting. This ×1.5 boosting is continued by the limiter/step-up/down control circuit 105 until the voltage of the large-capacity secondary power supply reaches 1.23 [V].

As a result, the charging voltage of the auxiliary capacitor 80 becomes equal to or greater than 1.24 [V]. Hence, the carrying mechanisms CS and CHM remain in the driving state.

[1.3.2.1.4] Equal To or Above 1.23 V

When the voltage of the large-capacity secondary power supply exceeds 1.23 [V], the limiter/step-up/down control circuit 105 controls the step-up/down circuit 49 based on the power supply voltage detection signal SPW from the power supply voltage detecting circuit 92C, thus making the step-up/down circuit 49 perform ×1 boosting (shorting mode), that is, no boosting.

More specifically, the step-up/down circuit 49 repeats the charging cycle and the charge transfer cycle in the charge transfer mode based on the step-up/down clock CKUD generated by the limiter/step-up/down control circuit 105 (see FIG. 11) using the clock signal CK from the clock generating circuit 104 (see FIG. 11).

In the charging cycle, as shown in FIG. 3(*b*), at the first step-up/down clock timing (parallel connection timing), the switch SW1 is turned on, the switch SW2 is turned off, the switch SW3 is turned on, the switch SW4 is turned off, the switch SW11 is turned on, the switch SW12 is turned off, the switch SW13 is turned on, the switch SW14 is turned off, and the switch SW21 is turned off. The capacitor 49*a* and the capacitor 49*b* are connected in parallel to the large-capacity secondary power supply 48, thus charging the capacitor 49*a* and the capacitor 49*b* with the voltage of the large-capacity secondary power supply 48.

In the charge transfer cycle, as shown in FIG. 3(*b*), at the second step-up/down clock timing (serial connection timing), the switch SW1 is turned on, the switch SW2 is turned off, the switch SW3 is turned off, the switch SW4 is turned on, the switch SW11 is turned on, the switch SW12 is turned off, the switch SW13 is turned off, the switch SW14 is turned on, and the switch SW21 is turned off. The capacitor 49*a* and the capacitor 49*b* are connected in parallel to the auxiliary capacitor 80. The auxiliary capacitor 80 is charged with the voltages of the capacitor 49*a* and the capacitor 49*b*, i.e., the voltage of the large-capacity secondary power supply 48, thus performing the charge transfer.

When the charging state of the auxiliary capacitor progresses, reaching the voltage in which a variation in the power supply voltage will be small when the state is shifted to the shorting mode, the state is shifted to the shorting mode.

Accordingly, the step-up/down circuit 49 performs ×1 boosting (shorting mode). This ×1 boosting is continued by the limiter/step-up/down control circuit 105 until the voltage of the large-capacity secondary power supply 48 falls below 1.23 [V].

As a result, the charging voltage of the auxiliary capacitor 80 becomes equal to or greater than 1.23 [V]. The carrying mechanisms CS and CHM remain in the driving state.

When it is detected that the voltage of the large-capacity secondary power supply 48 exceeds the pre-voltage VPRE (2.3 [V] in FIG. 12) by means of the pre-voltage detecting circuit 92B, the pre-voltage detecting circuit 92B outputs the limiter enabling signal SLMEN to the limiter-on voltage detecting circuit 92A. The limiter-on voltage detecting circuit 92A enters an operating state. The limiter-on voltage detecting circuit 92A compares the charging voltage VC of the large-capacity secondary power supply 48 with the preset limiter-on reference voltage VLMON at predetermined sampling intervals, thus determining whether to activate the limiter circuit LM.

In this case, the power generating unit A intermittently generates power. When a power generation period has an interval equal to or greater than a first period, the limiter-on voltage detecting circuit 92A performs the detection at sampling intervals having a second period that is not greater than the first period.

When the charging voltage VC of the large-capacity secondary power supply 48 exceeds 2.5 [V], the limiter-on signal SLMON is output to the limiter circuit LM so as to cause the limiter circuit LM to enter an on-state.

As a result, the limiter circuit LM becomes such that the power generating unit A is electrically decoupled from the large-capacity power supply 48.

Accordingly, excessive generated voltage VGEN is not applied to the large-capacity secondary power supply 48. This prevents damage to the large-capacity secondary power supply 48 resulting from application of a voltage exceeding the withstanding voltage of the large-capacity secondary power supply, thereby preventing damage to the timepiece 1.

Subsequently, when the power generation is not detected by the power generation detector 91 any more, and the power generation state detection signal SPDET is not output from the power generation state detector 91, the limiter circuit LM enters an off-state despite the charging voltage VC of the large-capacity secondary power supply 48. The limiter-on voltage detecting circuit 92A, the pre-voltage detecting circuit 92B, and the power supply voltage detecting circuit 92C enter the non-operating state.

[1.3.2.1.5] Processing When Step-up/down Multiplying Factor is Increased

When the limiter circuit LM is in the on-state, and the voltage of the large-capacity secondary power supply 48 is being boosted by the step-up/down circuit 49, it is necessary to decrease the step-up/down multiplying factor or to stop boosting for safety.

More generally, when the generated voltage by the power generator 40 is equal to or greater than the preset limiter-on voltage based on the detection result from the limiter-on voltage detecting circuit 92A, and when the power step-up circuit 49 is boosting the voltage, a step-up/down multiplying factor N is set to a step-up/down multiplying factor N' (N' is a real number, and $1 \leqq N' < N$).

This is to reliably prevent damage resulting from exceeding the absolute rated voltage due to the boosting when it is assumed that a voltage suddenly increases, such as when the state is shifted from a non-generating state to the power generation state.

[1.3.2.2] When Voltage of Large-capacity Secondary Power Supply Decreases

[1.3.2.2.1] Equal To or Above 1.20[V]

When the charging voltage VC of the large-capacity secondary power supply 48 exceeds 2.5 [V], the limiter-on signal SLMON is output to the limiter circuit LM, thus causing the limiter circuit LM to enter the on-state. The limiter circuit LM is in a state in which the power generating unit A is electrically decoupled from the large-capacity secondary power supply 48.

In this state, all of the limiter-on voltage detecting circuit 92A, the pre-voltage detecting circuit 92B, and the power supply voltage detecting circuit 92C are in the operating state.

Subsequently, when the charging voltage VC of the large-capacity secondary power supply 48 falls below 2.5 [V], the limiter-on voltage detecting circuit 92A stops outputting the limiter enabling signal SLMEN to the limiter circuit LM. Hence, the limiter circuit LM enters the off-state.

When the charging voltage VC of the large-capacity secondary power supply 48 further decreases below 2.3 [V], the pre-voltage detecting circuit 92B stops outputting the limiter enabling signal SLMEN to the limiter-on voltage detecting circuit 92A. The limiter-on voltage detecting circuit 92A enters the non-operating state. The limiter circuit LM enters the off-state.

In the above normalization, the limiter/step-up/down control circuit 105 controls the step-up/down circuit 49 based on the power supply voltage detection signal SPW from the power supply voltage detecting circuit 92C, thus making the step-up/down circuit 49 perform ×1 boosting, that is, no boosting. The carrying mechanisms CS and CHM remain in the driving state.

[1.3.2.2.2] 1.20 [V] To 0.80 [V]

When the voltage of the large-capacity secondary power supply falls below 1.23 [V], the limiter/step-up/down control circuit 105 controls the step-up/down circuit 49 based on the power supply voltage detection signal SPW from the power supply voltage detecting circuit 92C, thus making the step-up/down circuit 49 perform ×1.5 boosting.

Accordingly, the step-up/down circuit 49 performs ×1.5 boosting. This ×1.5 boosting is continued by the limiter/step-up/down control circuit 105 until the voltage of the large-capacity secondary power supply becomes 0.80 [V].

As a result, the charging voltage of the auxiliary capacitor 80 becomes equal to or greater than 1.2 [V] and below 1.8 [V]. The carrying mechanisms CS and CHM remain in the driving state.

[1.3.2.2.3] 0.80 [V] To 0.60 [V]

When the voltage of the large-capacity secondary power supply 48 falls below 0.80 [V], the limiter/step-up/down control circuit 105 controls the step-up/down circuit 49 based on the power supply voltage detection signal SPW from the power supply voltage detecting circuit 92C, thus making the step-up/down circuit 49 perform ×2 boosting.

Accordingly, the step-up/down circuit 49 performs ×2 boosting. This ×2 boosting is continued by the limiter/step-up/down control circuit 105 until the voltage of the large-capacity secondary power supply becomes 0.60 [V].

As a result, the charging voltage of the auxiliary capacitor 80 becomes equal to or greater than 1.20 [V] and below 1.6 [V]. The carrying mechanisms CS and CHM remain in the driving state.

[1.3.2.2.4] 0.6 [V] To 0.45 [V]

When the voltage of the large-capacity secondary power supply falls below 0.60 [V], the limiter/step-up/down control circuit 105 controls the step-up/down circuit 49 based on the power supply voltage detection signal SPW from the power supply voltage detecting circuit 92C, thus making the step-up/down circuit 49 perform ×3 boosting.

Accordingly, the step-up/down circuit 49 performs ×3 boosting. This ×3 boosting is continued by the limiter/step-up/down control circuit 105 until the voltage of the large-capacity secondary power supply 49 becomes 0.45 [V].

As a result, the charging voltage of the auxiliary capacitor 80 becomes equal to or greater than 1.35 [V] and below 1.8 [V]. The carrying mechanisms CS and CHM remain in the driving state.

[1.3.2.2.5] Below 0.45 [V]

When the voltage of the large-capacity secondary power supply 48 falls below 0.45 [V], the step-up/down circuit 49 enters the non-operating state, and the carrying mechanisms CS and CHM enter the non-driving state. Only the large-capacity secondary power supply 48 is charged.

Accordingly, wasteful power consumption involved in the boosting is reduced, and a period of time until reactivation of the carrying mechanisms CS and CHM is shortened.

[1.3.2.2.6] Processing When Voltage Multiplying Factor Decreases

It is necessary not to decrease again the step-up/down multiplying factor until a sufficient period of time, in which an actual charging voltage Vc is stabilized, elapses from a time at which the step-up/down multiplying factor is previously decreased (for example, from ×2 to ×1.5).

This is because, even when the step-up/down multiplying factor is decreased, an actual voltage does not suddenly change after the boosting. Rather, the voltage gradually approaches a voltage obtained after the step-up/down multiplying factor is decreased. Hence, the step-up/down multiplying factor becomes too small.

More generally, it is determined whether a predetermined period of multiplying factor change inhibiting time elapses from the time at which the step-up/down multiplying factor N (N is a real number) is changed to the step-up/down 10 multiplying factor N' (N' is a real number, and 1≦N' <1). Until the predetermined period of the multiplying factor change inhibiting time elapses from the previous changing of the step-up/down multiplying factor N to the step-up/down multiplying factor N', changing of the step-up/down multiplying factor is inhibited.

[1.4] Advantages of First Embodiment

As described above, according to the first embodiment, when shifting from a state in which the charge is transferred from the large-capacity secondary power supply 48 to the auxiliary capacitor 80 via the step-up/down circuit by the step-up/down multiplying factor M' (M' is a positive real number excluding one) to a state in which the large-capacity secondary power supply 48 and the auxiliary capacitor 80 are electrically directly coupled, the electrical energy is transferred from the large-capacity secondary power supply 48 to the auxiliary capacitor 80 via the step-up/down circuit by the step-up/down multiplying factor M=1 in a non-stepping-up/down state. Hence, a potential difference between the large-capacity secondary power supply 48 and the auxiliary capacitor 80 is below a predetermined potential difference. This prevents a sudden variation in the power supply voltage resulting from the change in the step-up/down multiplying factor. Therefore, malfunctioning in an electronic apparatus, particularly a portable electronic apparatus (timepiece), caused by a sudden variation in a power supply voltage can be prevented.

[2] Second Embodiment

As described in the first embodiment, in FIGS. 20 and 21, the power consumption is detected, and the number of charge transfers per unit time is set based on the detected power consumption. In the second embodiment, a ROM (functioning as number-of-transfers storage means) for storing the number of transfers is provided. Memory content is read out from the ROM based on the state control signals L1ON to LnON corresponding to the driven units L1 to Ln. Based on the clock signal generated by the pulse synthesis circuit 22, the clock signal CK corresponding to the magnitude of a load is output from a clock selector (functioning as number-of-transfers determining means). In the following description, a case in which there are three driven units, i.e., the driven units L1 to L3, is described in order to make the description simple. The magnitude of loads is as follows:

(heavy load) L1>L2>L3 (light load)

Figures 23, 24:
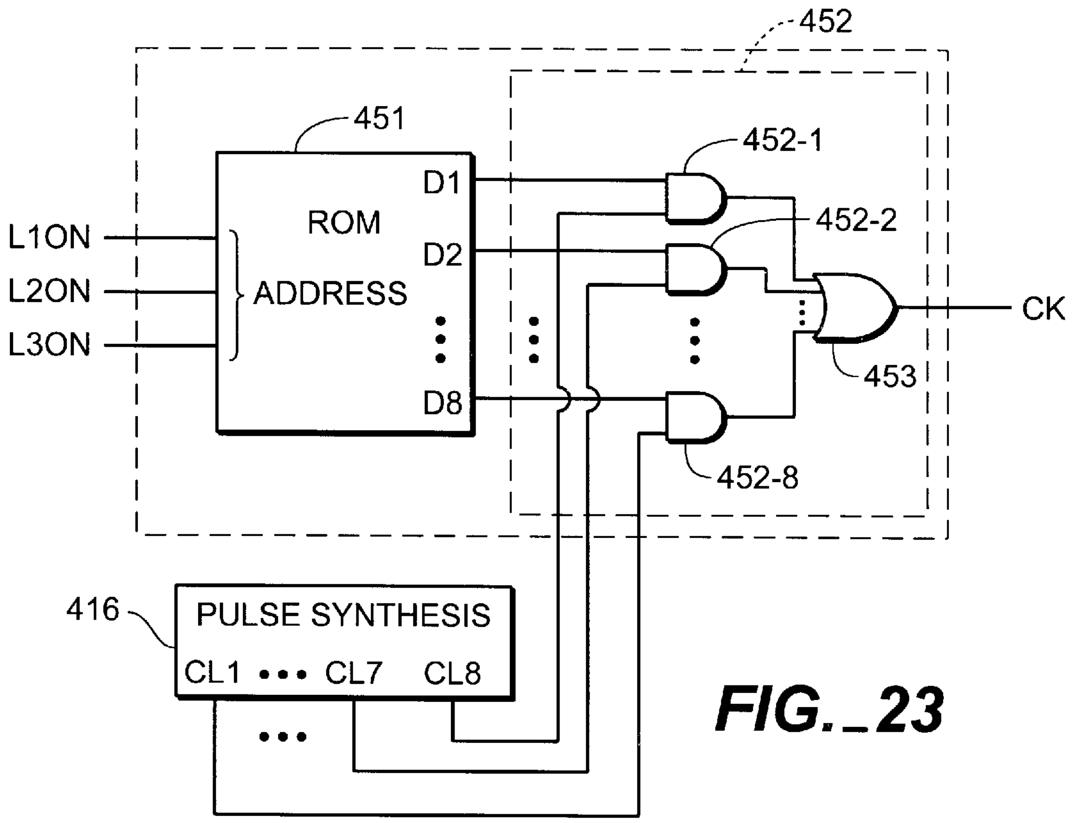
FIG. 23 is a block diagram of the schematic structure of the reference clock signal output circuit of a second embodiment.
FIG. 24 is an illustration of the operation of the reference clock signal output circuit of the second embodiment.

Referring to FIG. 23, the structure of the second embodiment is described.

A reference clock signal output circuit 450 is roughly divided into a ROM 451 for making one of output terminals D1 to D8 become an "H" level based on the signal states of the state control signals L1ON to L3ON corresponding to a driving state and a non-driving state of the driven units L1 to L3, and a clock selector 452 for selecting from the clock signals CL1 to CL8 generated by the pulse synthesis circuit 22 based on the signal states of the output terminals D1 to D8 of the ROM and for outputting the selected signal as the clock signal CK to the step-up/down multiplying factor control clock generating circuit 202.

The clock selector 452 includes a first AND circuit 452-1 in which one input terminal is connected to the output terminal D1 and the clock signal CL8 generated by the pulse synthesis circuit 22 is input to the other input terminal, thus outputting the clock signal CL8 as the clock signal CK when the output terminal D1 is at the "H" level; a second AND circuit 452-2 in which one input terminal is connected to the output terminal D2 and the clock signal CL7 generated by the pulse synthesis circuit 22 is input to the other input terminal, thus outputting the clock signal CL7 as the clock signal CK when the output terminal D2 is at the "H" level; a third AND circuit 452-3 (not shown) in which one input terminal is connected to the output terminal D3 and the clock signal CL6 generated by the pulse synthesis circuit 22 is input to the other terminal, thus outputting the clock signal CL6 as the clock signal CK when the output terminal D3 is at the "H" level; a fourth AND circuit 452-4 (not shown) in which one input terminal is connected to the output terminal D4 and the clock signal CL5 generated by the pulse synthesis circuit 22 is input to the other terminal, thus outputting the clock signal CL5 as the clock signal CK when the output terminal D4 is at the "H" level; a fifth AND circuit 452-5 (not shown) in which one input terminal is connected to the output terminal D5 and the clock signal CL4 generated by the pulse synthesis circuit 22 is input to the other terminal, thus outputting the clock signal CL4 as the clock signal CK when the output terminal D5 is at the "H" level; a sixth AND circuit 452-6 (not shown) in which one input terminal is connected to the output terminal D6 and the clock signal CL3 generated by the pulse synthesis circuit 22 is input to the other terminal, thus outputting the clock signal CL3 as the clock signal CK when the output terminal D6 is at the "H" level; a seventh AND circuit 452-7 (not shown) in which one input terminal is connected to the output terminal D7 and the clock signal CL2 generated by the pulse synthesis circuit 22 is input to the other terminal, thus outputting the clock signal CL2 as the clock signal CK when the output terminal D7 is at the "H" level; an eighth AND circuit 452-8 (not shown) in which one input terminal is connected to the output terminal D8 and the clock signal CL1 generated by the pulse synthesis circuit 22 is input to the other terminal, thus outputting the clock signal CL1 as the clock signal CK when the output terminal D8 is at the "H" level; and an OR circuit 453 for obtaining the logical OR of outputs of the first AND circuit to the eighth AND circuit and outputting one of the clock signals CL1 to CL8 as the clock signal CK.

Referring now to FIGS. 23 and 24, the operation is described.

As shown in FIG. 24, one of the output terminals D1 to D8 of the ROM exclusively becomes the "H" level in accordance with the states of the state control signals L1ON to L3ON corresponding to the driven units L1 to L3.

More specifically, the operation is described using an example.

For example, when all the driven units L1 to L3 are in the non-driving state, all the state control signals L1ON to L3ON are at the "L" level, that is, "0". Therefore, only the output terminal D1 of the ROM 451 is at the "H" level.

As a result, one terminal of the first AND circuit 452-1 of the clock selector 452 becomes the "H" level. Hence, the clock signal CL8 is output from an output terminal of the first AND circuit 452-1 to the OR 453 circuit.

The outputs of the second to eighth AND circuits 452-2 to 452-8 all become the "L" level.

Therefore, the OR circuit 453 outputs the clock signal CL8 as the clock signal CK.

Similarly, when only the driven unit L2 is in the driving state, the state control signal L2ON is at the "H" level, i.e., "1", and the state control signals L1ON and L3ON are at the "L" level, i.e., "0". Therefore, only the output terminal D3 of the ROM 451 is at the "H" level.

As a result, one terminal of the third AND circuit 452-3 becomes the "H" level. Hence, the clock signal CL6 is output from an output terminal of the third AND circuit to the OR 453 circuit.

All the outputs of the first, second, fourth to eighth AND circuits 452-2, and 452-4 to 452-8 become the "L" level.

Therefore, the OR circuit 453 outputs the clock signal CL6 as the clock signal CK.

When all the driven units L1 to L3 are in the driving state, all the state control signals L1ON to L3ON are at the "H" level, i.e., "1". Therefore, only the output terminal D8 of the ROM 451 is at the "H" level.

As a result, one terminal of the eighth AND circuit 452-8 becomes the "H" level. Hence, the clock signal CL1 is output from an output terminal of the eighth AND circuit 452-8 to the OR circuit 453.

All the outputs of the first to seventh AND circuits 452-1 to 452-7 become the "L" level.

Therefore, the OR circuit 453 outputs the clock signal CL1 as the clock signal CK.

The other operations and advantages are the same as those in the first embodiment.

[3] Third Embodiment

The structure of a third embodiment having a pulse synthesis circuit used for determining the number of transfers based on the capacitance of a step-up/down capacitor is described.

A pulse synthesis circuit 22A of the third embodiment can replace the pulse synthesis circuit 22 of the second embodiment.

Figure 25:
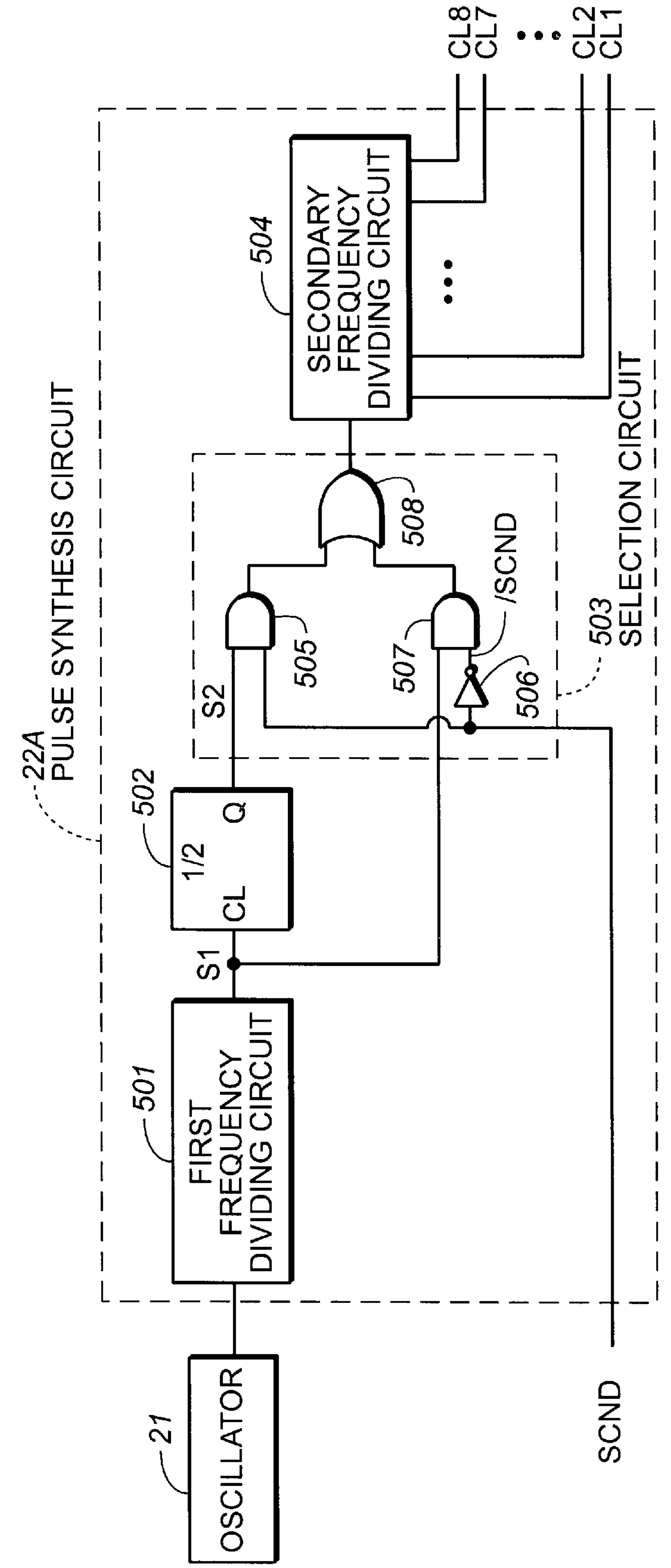
FIG. 25 is a block diagram of the schematic structure of a pulse synthesis circuit of a third embodiment.

In FIG. 25, a block diagram of the schematic structure of the pulse synthesis circuit of the third embodiment is shown.

As shown in FIG. 25, the pulse synthesis circuit 22A includes a first frequency dividing circuit 501 for dividing a reference pulse signal of the oscillator 21 and outputting a first divided signal S1; a ½ frequency dividing circuit 502 in which the first divided signal S1 is input to a clock terminal for dividing the first divided signal S1 by half to be output as a second divided signal S2; a selection circuit 503 for selectively outputting the first divided signal S1 or the second divided signal S2 based on a capacitor capacitance signal SCND which becomes an "H" level when the capacitance of the step-up/down capacitor is larger than a predetermined reference capacitance; and a second frequency dividing circuit 504 for dividing an output signal of the selection circuit 503 and generating clock signals CL1 to CL8.

The selection circuit 503 includes a first AND circuit 505 in which the second divided signal S2 is input to one input terminal and the capacitor capacitance signal SCND is input to the other input terminal; an inverter 506 for inverting the capacitor capacitance signal SCND and outputting an inverted capacitor capacitance signal /SCND; a second AND circuit in which the first divided signal S1 is input to one input terminal and the inverted capacitor capacitance signal /SCND is input to the other input terminal; and an OR circuit 508 in which one input terminal is connected to the first AND circuit 505 and the other input terminal is connected to the second AND circuit 507.

Next, the operation is described.

The first frequency dividing circuit 501 of the pulse synthesis circuit 22A divides the reference pulse signal from the oscillator 21 and outputs the first divided signal S1 to the ½ frequency dividing circuit 502 and to the second AND circuit 507 of the selection circuit 503.

The ½ frequency dividing circuit 502 divides the first divided signal S1 by half and outputs the resultant signal as the second divided signal S2 to the first AND circuit 505.

In contrast, the inverter 506 inverts the capacitor capacitance signal SCND and outputs the inverted capacitor capacitance signal /SCND to the second AND circuit 507.

As a result, when the step-up/down capacitor capacitance signal SCND is at the "H" level, that is, when the capacitance of the capacitor is larger than the predetermined reference capacitance, the second divided signal S2 is input to the OR circuit 508. When the capacitor capacitance signal SCND is at the "L" level, that is, when the capacitance of the step-up/down capacitor is smaller than the predetermined reference capacitance, the first divided signal S1 is input to the OR circuit 508.

Accordingly, the second frequency dividing circuit 504 divides the output signal from the selection circuit 503 and generates the clock signals CL1 to CL8. When the capacitance of the capacitor is larger than the reference capacitance, the frequencies of the clock signals CL1 to CL8 generated by the frequency dividing have values half the frequencies of the clock signals CL1 to CL8 generated when the capacitance of the capacitor is smaller than the reference capacitance.

Concerning this, when the capacitance of the step-up/down capacitor is small, the amount of transferred charge per transfer is small. Therefore, the number of transfers, i.e., the transfer clock, is increased. When the capacitance of the step-up/down capacitor is large, the amount of transferred charge per transfer is large. The transfer clock is decreased so as to decrease the number of transfers.

According to the third embodiment, an appropriate transfer clock can be obtained in accordance with the capacitance of the step-up/down capacitor. Hence, the charge transfer can be performed more efficiently.

[4] Fourth Embodiment

In the above embodiments, driving of loads is not forcedly stopped when the charge is being transferred. In contrast, in a fourth embodiment, driving of heavy-load driven units is forcedly inhibited when the charge is being transferred.

Figure 26:
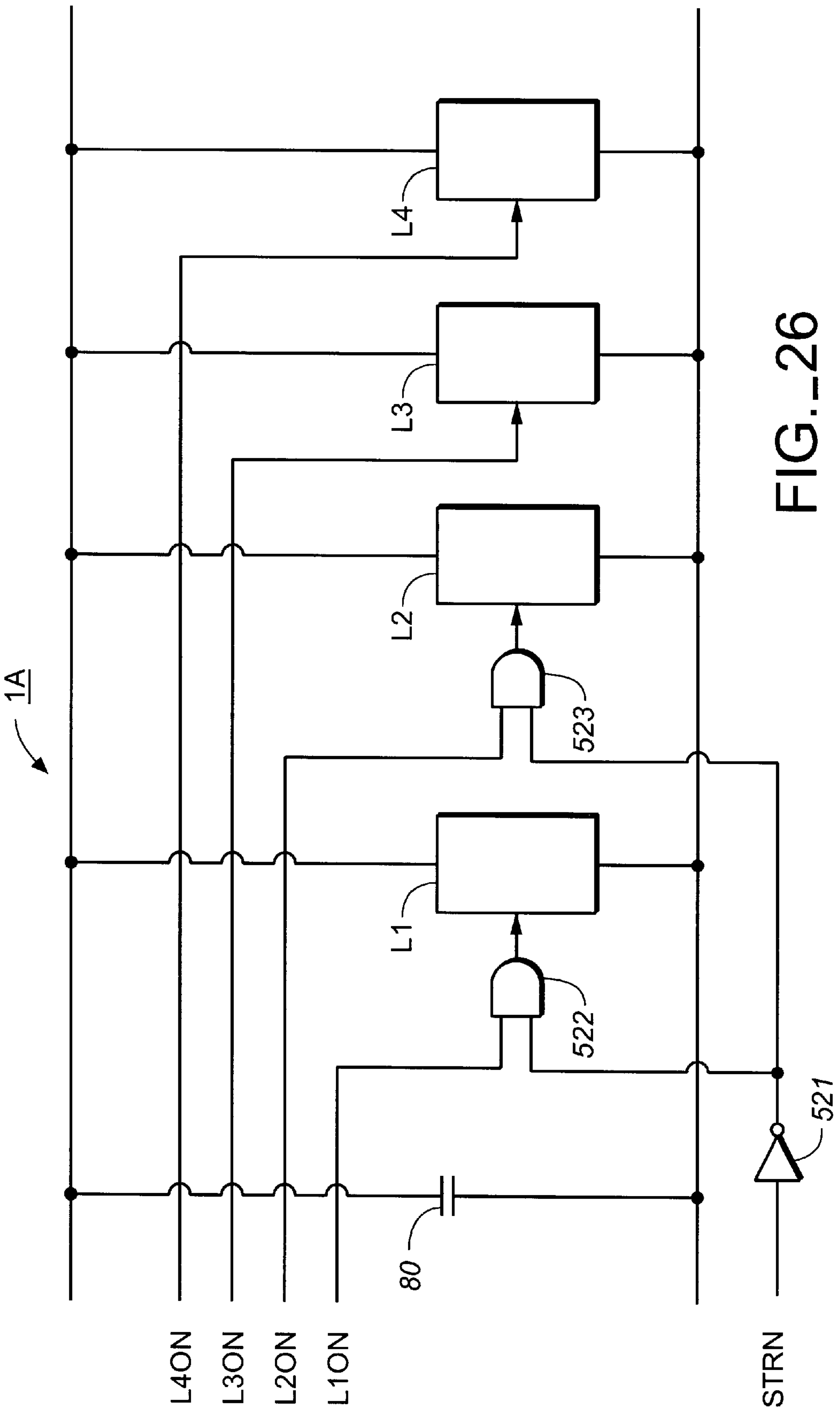
FIG. 26 is a block diagram of the schematic structure of basic portions of a fourth embodiment.

In FIG. 26, the schematic structure of basic portions of a timepiece according to the fourth embodiment is shown.

A timepiece 1A includes four driven units L1 to L4. The driven units L1 and L2 have loads heavier than the driven units L3 and L4.

The timepiece 1A includes an inverter 521 for inverting the charge transfer mode signal STRN, which becomes the "H" level in the transition of the step-up/down multiplying factor from ×1.5 boosting to ×1 boosting (that is, no boosting), in the transition of the step-up/down multiplying factor from the stepping-down by ½ to ×1 boosting, in a period of one to two periods (undefined within this range) of the clock signal CK, and for outputting an inverted charge transfer mode signal /STRN; an AND circuit 522 in which the state control signal L1ON, which becomes the "H" level when activating the driven unit L1 and which becomes the "L" level when deactivating the driven unit L1, is input to one input terminal, and the inverted charge transfer mode signal /STRN is input to the other input terminal, thus switching between the driving state and the non-driving state based on the state control signal L1ON when the charge is not being transferred, or forcedly deactivating the driven unit L1 despite the signal level of the state control signal L1ON in the charge transfer mode; and an AND circuit 523 in which the state control signal L2ON, which becomes the "H" level when activating the driven unit L2 and which becomes the "L" level when deactivating the driven unit L2, is input to one input terminal, and the inverted charge transfer mode signal /STRN is input to the other input terminal, thus switching between the driving state and the non-driving state based on the state control signal L2 when the charge is not being transferred, or forcedly deactivating the driven unit L2 despite the signal level of the state control signal L2ON in the charge transfer mode.

In this case, the inverter 521, the AND circuit 522, and the AND circuit 523 function as means for inhibiting driving of a heavy load when the charge is being transferred.

Next, the operation is described.

First, the operation in the non-transfer mode is described.

In the non-transfer mode, the charge transfer mode signal STRN is at the "L" level. Hence, the inverted charge transfer mode signal /STRN output from the inverter 521 is at the "H" level.

Therefore, the AND circuit 522 switches between the driving state and the non-driving state based on the state control signal L1ON, and the AND circuit 523 switches between the driving state and the non-driving state based on the state control signal L2ON.

At the same time, the driven unit L3 is switched between the driving state and the non-driving state based on the state control signal L3ON, and the driven unit L4 is switched between the driving state and the non-driving state based on the state control signal L4ON.

In contrast, in the transfer mode, the charge transfer mode signal STRN is at the "H" level. Hence, the inverted charge transfer mode signal /STRN is at the "L" level.

Therefore, the AND circuit 522 outputs an "L" level despite the signal level of the state control signal L1ON, thus deactivating the driven unit L1.

Similarly, the AND circuit 523 outputs an "L" level despite the signal level of the state control signal L2ON, thus deactivating the driven unit L2.

Even in this case, the driven unit L3 is switched between the driving state and the non-driving state based on the state control signal L3ON, and the driven unit L4 is switched between the driving state and the non-driving state based on the state control signal L4ON.

According to the fourth embodiment, in the charge transfer mode, the heavy-load driven units L1 and L2 are always deactivated, thus stably driving the timepiece.

Specifically, even when the charge transfer cycle is increased, the subsequent stage circuits cannot be stably driven by the power supply ability in the charge transfer mode. In order to drive the subsequent stage circuits (for example, a motor drive circuit, an alarm drive circuit, a sensor drive circuit, an illumination drive circuit, and the like) consuming large power, which can be driven only when the voltage is ×1 boosted (shorting mode), the operation of the subsequent stage circuits consuming large power is inhibited in the charge transfer mode, thus stabilizing the power supply voltage. This prevents malfunctioning in the central control circuit 93, the pulse synthesis circuit 22, and the like resulting from a decrease in the power supply voltage caused by operating the subsequent stage circuits consuming large power. Furthermore, the operation of the subsequent stage circuits consuming large power can be stabilized.

[5.] Modifications of the Embodiments

[5.1] First Modification

In the above description, the case in which the step-up/down multiplying factor is changed through the charge transfer mode in the transition from ×1.5 boosting to ×1 boosting (no boosting) is described. The present invention can be applied to a case in which the step-up/down multiplying factor is changed through the charge transfer mode in the transition from ×L boosting (L is a positive real number less than one) to ×1 boosting (no boosting).

In this case, the charge is not suddenly transferred between the auxiliary capacitor 80 and the large-capacitance secondary power supply 48, and power can stably be supplied.

[5.2] Second Modification

The various voltage values in the above embodiments are provided by way of example. Of course, the voltage values can be modified in accordance with corresponding electronic apparatuses (portable electronic apparatuses).

[5.3] Third Modification

In the above embodiments, the example in which the timepiece indicates the hour/minute and the seconds using two motors is described. The present invention is applicable to a timepiece for indicating the hour/minute and the seconds using a single motor.

In contrast, the present invention is applicable to a timepiece having three or more motors (motors for independently controlling the seconds hand, the minute hand, the hour hand, the calendar, the chronograph, and the like).

[5.4] Fourth Modification

In the above embodiments, the electromagnetic power generator for transferring the rotational movement of the oscillating weight 45 to the rotor 43 and generating the electromotive force Vgen in the output coil 44 using the rotation of the rotor 43 is used as the power generator 40. The present invention is not limited to the electromagnetic power generator. For example, a power generator for generating rotational movement by a restoring force (corresponding to first energy) of a spring and generating power using the rotational movement may be used. Alternatively, a power generator for applying oscillation, which is caused by external excitement or self-excitement, or displacement (corresponding to the first energy) to a piezoelectric member and for generating power due to the piezoelectric effects can be used.

In addition, a power generator for generating power by photo-electrically converting light energy (corresponding to first energy), including sunlight, can be used.

Furthermore, a power generator for thermoelectrically generating power using a temperature difference (thermal energy, corresponding to the first energy) between one member and another member can be used.

It is possible to use an electromagnetic induction power generator for receiving floating electromagnetic waves of airwaves and of communication waves and for utilizing that energy (corresponding to the first energy).

It is possible to use a plurality of different power generators.

[5.5] Fifth Modification

In the above embodiments, the wristwatch-type timepiece 1 is described by way of example. The present invention is not limited to this example. Apart from the wristwatch, the present invention is applicable to a pocket watch or the like. The present invention can be applied to various electronic apparatuses, and particularly to portable electronic apparatuses including a calculator, a cellular phone, a portable personal computer, an electronic notebook, a portable radio, and a portable VTR.

[5.6] Sixth Modification

In the above embodiments, the reference voltage (GND) is set to Vdd (high-potential side). Needless to say, the reference voltage (GND) can be set to Vss (low-potential side). In this case, the preset values Vo and Vbas indicate potential differences from the detection level at the high-potential side based on the reference Vss.

[6] Advantages of the Embodiments

According to the above embodiments, in the transition from a state in which electrical energy is transferred from a first power supply to a second power supply through a power supply step-up/down circuit by a step-up/down multiplying factor to a state in which the first power supply and the second power supply are electrically directly coupled, the electrical energy is transferred from the first power supply to the second power supply through the power supply step-up/down circuit by the step-up/down multiplying factor M=1 in a non-stepping-up/down state. A potential difference between the first power supply and the second power supply is maintained less than a predetermined potential difference. Hence, a sudden variation in a power supply voltage caused by changing the step-up/down multiplying factor does not occur. This prevents malfunctioning in an electronic apparatus (portable electronic apparatus) resulting from a sudden voltage variation in the power supply voltage.

What is claimed is:

1. An electronic apparatus characterized by comprising:

a power generating means for performing power generation by converting first energy into second energy which is electrical energy;

a first power supply means for accumulating the electrical energy obtained by said power generating means;

a power supply voltage converting means for converting the voltage of the electrical energy supplied from said first power supply means by a voltage-conversion multiplying factor M (M is a positive real number);

a second power supply means, to which the electrical energy accumulated in said first power supply means is transferred through said power supply voltage converting means, for accumulating the transferred electrical energy;

a driven means driven by the electrical energy supplied from said first power supply means or said second power supply means; and non-voltage-converting transfer control means for transferring, in the transition from a state in which the electrical energy is being transferred from said first power supply means to said second power supply means through said power supply voltage converting means by a voltage-conversion multiplying factor M' (M' is a positive real number except for one) to a state in which said first power supply means and said second power supply means are electrically directly coupled, the electrical energy from said first power supply means to said second power supply means through said power supply voltage converting means by the voltage-conversion multiplying factor M=1 in a non-voltage-converting state, wherein a potential difference between said first power supply means and said second power supply means is less than a predetermined potential difference.

2. An electronic apparatus according to claim 1, characterized in that:

the electrical energy transfer to said second power supply means is performed in an accumulating cycle for accumulating the electrical energy from said first power supply means in said power supply voltage converting means and a transfer cycle for transferring the electrical energy accumulated in said power supply voltage converting means to said second power supply means; and said non-voltage-converting transfer control means further including a number-of-transfers control means for changing, when the accumulating cycle and the transfer cycle are repeated, the number of transfers which is the number of transfer cycles per unit time based on the electrical energy transfer ability required.

3. An electronic apparatus according to claim 2, characterized in that:

said number-of-transfers control means determines the number of transfers based on power consumed by said driven means.

4. An electronic apparatus according to claim 3, characterized by comprising:

a power consumption detecting means for detecting the power consumed by said driven means.

5. An electronic apparatus according to claim 2, characterized in that:

said number-of-transfers control means includes number-of-transfers storage means for storing beforehand the numbers of transfers corresponding to a plurality of driven means; and number-of-transfers determining means for determining the number of transfers to be read from said number-of-transfers storage means by referring to the driven means to be actually driven from among said plurality of driven means.

6. An electronic apparatus according to claim 2, characterized in that:

said power supply voltage converting means includes a step-up/down capacitor for performing voltage conversion; and said number-of-transfers control means determines the number of transfers based on the capacitance of said step-up/down capacitor.

7. An electronic apparatus according to claim 2, characterized in that:

in a single transfer cycle, when a transferable electrical energy amount is expressed by Q0, the number of transfers per unit time is expressed by N, and power consumed by said driven means per unit time is expressed by QDRV, said number-of-transfers control means determines the number of transfers per unit time N so as to satisfy the following expression:

$$QDRV \leqq Q0 \times N$$

8. An electronic apparatus according to claim 1, characterized in that:

said non-voltage-converting transfer control means includes means for inhibiting, when the electrical energy is being transferred to said second power supply means in the non-voltage-converting state, driving of a high load during a transfer for inhibiting driving of said driven means that consumes power exceeding power corresponding to electrical energy which can be supplied in the transfer.

9. An electronic apparatus according to claim 1, characterized in that:

said driven means includes timer means for indicating the time.

10. A control method for an electronic apparatus including a power generator for performing power generation by converting first energy into second energy which is electrical energy; a first power supply for accumulating the electrical energy obtained by the power generation; a power supply voltage converter for converting the voltage of the electrical energy supplied from said first power supply by a voltage-conversion multiplying factor M (M is a positive real number); a second power supply, to which the electrical energy accumulated in said first power supply is transferred through said power supply voltage converter, for accumulating the transferred electrical energy; and a driven unit driven by the electrical energy supplied from said first power supply or said second power supply; said control method characterized by comprising:

a non-voltage-converting transfer control step of transferring, in the transition from a state in which the electrical energy is being transferred from said first power supply to said second power supply through said power supply voltage converter by a voltage-conversion multiplying factor M' (M' is a positive real number except for one) to a state in which said first power supply and said second power supply are electrically directly coupled, the electrical energy from said first power supply to said second power supply through said power supply voltage converter by the voltage-conversion multiplying factor M=1 in a non-voltage-converting state, wherein a potential difference between said first power supply and said second power supply is less than a predetermined potential difference.

11. A control method for an electronic apparatus according to claim 10, said control method characterized in that:

the electrical energy transfer to said second power supply is performed in an accumulating cycle for accumulating the electrical energy from said first power supply in said power supply voltage converter and a transfer cycle for transferring the electrical energy accumulated in said power supply voltage converter to said second power supply; and said non-voltage-converting transfer control step includes a number-of-transfers control step of changing, when the accumulating cycle and the transfer cycle are repeated, the number of transfers which is the number of transfer cycles per unit time based on the electrical energy transfer ability required.

12. A control method for an electronic apparatus according to claim 11, said control method characterized in that:

said number-of-transfers control step determines the number of transfers based on power consumed by said driven unit.

13. A control method for an electronic apparatus according to claim 12, said control method characterized by comprising:

a power consumption detecting step of detecting the power consumed by said driven unit.

14. A control method for an electronic apparatus according to claim 11, said control method characterized in that:

said number-of-transfers control step includes a number-of-transfers determining step of determining, from among the pre-stored numbers of transfers corresponding to a plurality of driven units, the number of transfers by referring to the driven unit to be actually driven.

15. A control method for an electronic apparatus according to claim 11, said control method characterized in that:

said power supply voltage converter includes a step-up/down capacitor for performing voltage conversion; and said number-of-transfers control step determines the number of transfers based on the capacitance of said step-up/down capacitor.

16. A control method for an electronic apparatus according to claim 11, said control method characterized in that:

in a single transfer cycle, when a transferable electrical energy amount is expressed by Q0, the number of transfers per unit time is expressed by N, and power consumed by said driven unit per unit time is expressed by QDRV, said number-of-transfers control step determines the number of transfers per unit time N so as to satisfy the following expression:

$$QDRV \leqq Q0 \times N$$

17. A control method for an electronic apparatus according to claim 10, said control method characterized in that:

said non-voltage-converting transfer control step includes a step of inhibiting, when the electrical energy is being transferred to said second power supply in the non-voltage-converting state, driving of a high load during a transfer for inhibiting driving of said driven unit that consumes power exceeding power corresponding to electrical energy which can be supplied in the transfer.

18. An electronic apparatus comprising:

a primary power supply;

a rechargeable auxiliary power supply;

a configurable switch network having a plurality of capacitors, said capacitors being configurable by said switch network to be all in series, all in parallel, or in a plurality of series connected sub-networks of single capacitor and parallel connected capacitors; and a configuration control circuit for alternatingly placing said configurable switch network in one of a charge-accumulation phase and a charge-transfer phase, said configurable switch network being coupled to said primary power supply and being electrically decoupled from said rechargeable auxiliary power supply during said charge-accumulation phase, said configurable switch network being effective for storing charge from said main power supply into at least one of said plurality of capacitors during said charge-accumulation phase and being effective for transferring charge to said rechargeable auxiliary power supply during said charge-transfer phase;

the configuration of said plurality of capacitors being selectively different during said charge-accumulation phase than the configuration during said charge-transfer phase as determined by said configuration control circuit to apply a voltage to said rechargeable auxiliary power supply that is selectively greater than, smaller than, or equal to the voltage of said primary power supply.

19. The electronic apparatus of claim 18 wherein said configuration control circuit alternates said configurable switch network between said charge-accumulation phase and said charge-transfer phase at a controlled frequency, said rechargeable auxiliary power supply further being coupled to a composite load having variable power consumption, said electronic apparatus further comprising:

a power monitoring circuit for monitoring the power consumption of said composite load, said configuration control circuit being responsive to said power monitoring circuit and being effective for increasing said controlled frequency in response to an increase in power consumption by said composite load, and effective for decreasing said controlled frequency in response to a decrease in power consumption by said composite load.

20. The electronic apparatus of claim 19 wherein said power monitoring circuit includes a resistive device and an analog-to-digital converter, said resistive device being in series between said rechargeable auxiliary power supply and said composite load whereby the voltage across said resistive device is proportional to the current through said composite load, said analog-to-digital converter being coupled across said resistive device to provide a discrete level representation of the voltage across said resistive device, said configuration control circuit adjusting said controlled frequency in accordance with said discrete level representation.

21. The electronic apparatus of claim 19 wherein said composite load includes a plurality of independently enabled sub-load circuits connected in parallel, said power monitoring circuit being effective for identifying the enabled sub-load circuits in said composite load, said power monitoring circuit further including a memory table having a predetermined power-use rating for each of said sub-load circuits, said power monitoring circuit being further effective for calculating the total power consumption of said composite load by summing the respective predetermined power-use rating of each enabled sub-load circuit.

22. The electronic apparatus of claim 19 wherein said composite load includes a plurality of independent sub-load circuits connected in parallel, said electronic apparatus further having an overriding disable signal generator effective for disabling at least one of said sub-load circuits during said charge-transfer phase.

23. The electronic apparatus of claim 22 wherein said overriding disable signal generator disables sub-load circuits categorized as having non-vital operations.

24. The electronic apparatus of claim 22 wherein said overriding disable signal generator disables sub-load circuits having a power consumption greater than a predetermined level.

25. The electronic apparatus of claim 18 wherein the amount of charge transfer from said configurable switch network to said rechargeable auxiliary power supply during said charge-transfer phase is expressed by Q0 and said configuration control circuit alternates said configurable switch network between said charge-accumulation phase and said charge-transfer phase at a controlled frequency up to a maximum frequency N;

said rechargeable auxiliary power supply further being coupled to a composite load including a plurality of independent sub-load circuits, the composite power consumption of said composite load being expressed as QDRV;

said electronic apparatus further having an overriding disable signal generator effective for disabling at least one of said sub-load circuits during said charge-transfer phase such that QDRV is at most equal to $Q0 \times N$.

26. the electronic apparatus of claim 18 wherein each of the configurations of said plurality of capacitors establishes a correspondingly characterizing equivalent capacitance for said configurable switch network, said control circuit being responsive to said equivalent capacitance and being effective for alternating said configurable switch network between said charge-accumulation phase and said charge-transfer phase at a frequency determined by said equivalent capacitance.

27. The electronic apparatus of claim 18 wherein said configurable switch network includes a first capacitor and a second capacitor, said first and second capacitors being connected in parallel to said primary power supply during said charge-accumulation phase;

said first capacitor, second capacitor and primary power supply being connected in series during said charge-transfer phase to form a charging circuit having a voltage three times greater than said primary power supply, said charging circuit being coupled across said rechargeable auxiliary power supply during said charge-transfer phase.

28. The electronic apparatus of claim 18 wherein said configurable switch network includes a first capacitor and a second capacitor, said first and second capacitors being connected in parallel to said primary power supply during said charge-accumulation phase;

said first capacitor and second capacitor forming a parallel-connected sub-network connected in series with said primary power supply during said charge-transfer phase to form a charging circuit having a voltage two times greater than said primary power supply, said charging circuit being coupled across said rechargeable auxiliary power supply during said charge-transfer phase.

29. The electronic apparatus of claim 18 wherein said configurable switch network includes a first capacitor and a second capacitor, said first and second capacitors forming a series connected sub-network connected in parallel to said primary power supply during said charge-accumulation phase;

said first capacitor and second capacitor forming a parallel-connected sub-network connected in series with said primary power supply during said charge-transfer phase to form a charging circuit having a voltage one and a half times greater than said primary power supply, said charging circuit being coupled across said rechargeable auxiliary power supply during said charge-transfer phase.

30. The electronic apparatus of claim 18 wherein said configurable switch network includes a first capacitor, said first capacitor being connected in parallel to said primary power supply during said charge-accumulation phase;

said first capacitor forming a charging circuit having a voltage substantially equal to said primary power supply during said charge-transfer phase, said charging circuit being coupled across said rechargeable auxiliary power supply and being decoupled from said primary power supply during said charge-transfer phase.

31. The electronic apparatus of claim 30 wherein said configurable switch network further includes a second capacitor connected in parallel to said first capacitor during said charge-accumulation phase and charge-transfer phase.

32. The electronic apparatus of claim 18 wherein said configurable switch network includes a first capacitor and a second capacitor, said first and second capacitors forming a series connected sub-network connected in parallel to said primary power supply during said charge-accumulation phase;

said first capacitor and second capacitors being connected in parallel during said charge-transfer phase to form a charging circuit having a voltage substantially equal to half that of said primary power supply, said charging circuit being coupled across said rechargeable auxiliary power supply and being decoupled from said primary power supply during said charge-transfer phase.

33. The electronic apparatus of claim 18 wherein said rechargeable auxiliary power supply is a capacitor.

34. The electronic apparatus of claim 18 wherein said primary power supply includes:

an energy conversion device for converting one of a mechanical energy, a light energy, a thermo energy, and an electromagnetic wave energy into an electrical energy;

a rechargeable primary energy storage device for storing said converted electrical energy.

35. The electronic apparatus of claim 18 wherein said rechargeable auxiliary power supply is for use in one of a time piece, a calculator, a cellular phone, a portable computer, an electronic notebook, a portable radio, and a portable VTR.

* * * * *